United States Patent
Baru et al.

(10) Patent No.: US 7,028,252 B1
(45) Date of Patent: Apr. 11, 2006

(54) SYSTEM AND METHOD FOR CONSTRUCTION, STORAGE, AND TRANSPORT OF PRESENTATION-INDEPENDENT MULTI-MEDIA CONTENT

(75) Inventors: Chaitanya Baru, San Diego, CA (US); James Chase, San Clemente, CA (US); T. Todd Elvins, Solana Beach, CA (US); Robert Todd Fassett, Del Mar, CA (US); Ernesto Nebel, Chula Vista, CA (US)

(73) Assignee: Oracle Cable, Inc., Redwood Shores, CA (US)

( * ) Notice: Subject to any disclaimer, the term of this patent is extended or adjusted under 35 U.S.C. 154(b) by 1175 days.

(21) Appl. No.: 09/814,623

(22) Filed: Mar. 22, 2001

Related U.S. Application Data

(63) Continuation-in-part of application No. 09/653,472, filed on Aug. 31, 2000, now Pat. No. 6,529,586.

(51) Int. Cl.
*G06F 17/21* (2006.01)

(52) U.S. Cl. ..................................... 715/500.1; 345/723
(58) Field of Classification Search .............. 715/500.1; 707/501, 513; 345/302, 115; 358/403
See application file for complete search history.

(56) References Cited

U.S. PATENT DOCUMENTS

| | | | |
|---|---|---|---|
| 4,945,476 A | 7/1990 | Bodick et al. ......... 364/413.02 |
| 5,127,043 A | 6/1992 | Hunt et al. .................... 379/88 |
| 5,146,439 A | 9/1992 | Jachmann et al. ............. 369/25 |
| 5,187,735 A | 2/1993 | Herrero Garcia et al. ..... 379/88 |
| 5,243,643 A | 9/1993 | Sattar et al. ................... 379/88 |
| 5,255,305 A | 10/1993 | Sattar .......................... 379/34 |
| 5,351,276 A | 9/1994 | Doll, Jr. et al. ............... 379/67 |
| 5,365,574 A | 11/1994 | Hunt et al. .................... 379/88 |
| 5,379,421 A | 1/1995 | Palazzi, III et al. ........ 395/600 |
| 5,473,744 A | * 12/1995 | Allen et al. .............. 715/500.1 |
| 5,530,852 A | 6/1996 | Meske, Jr. et al. .......... 395/600 |
| 5,537,586 A | 7/1996 | Amram et al. .............. 395/600 |
| 5,608,786 A | 3/1997 | Gordon ....................... 379/100 |
| 5,654,886 A | 8/1997 | Zereski, Jr. et al. ........ 364/420 |
| 5,661,787 A | 8/1997 | Pocock .................. 379/101.01 |
| 5,682,330 A | * 10/1997 | Seaman et al. .............. 358/403 |
| 5,761,662 A | 6/1998 | Dasan .......................... 707/10 |
| 5,799,063 A | 8/1998 | Krane .......................... 379/67 |
| 5,809,250 A | 9/1998 | Kisor .................... 395/200.57 |
| 5,825,854 A | 10/1998 | Larson et al. ................. 379/67 |
| 5,884,262 A | 3/1999 | Wise et al. .................. 704/270 |
| 6,005,560 A | * 12/1999 | Gill et al. ................. 715/500.1 |
| 6,088,673 A | 7/2000 | Lee et al. .................... 704/260 |
| 6,092,067 A | 7/2000 | Girling et al. ............. 707/100 |
| RE38,284 E | * 10/2003 | Allen et al. .............. 715/500.1 |

OTHER PUBLICATIONS

Article entitled NewsML Overview, dated Mar. 16, 2000 by Jo Rabin.
Document entitled "NewsML Version 1.0", Functional Specification dated Oct. 24, 2000.

* cited by examiner

*Primary Examiner*—Sanjiv Shah
(74) *Attorney, Agent, or Firm*—Park, Vaughan & Fleming, LLP

(57) ABSTRACT

Extensible, multi-presentation content is created in human/machine readable form, where each data object may contain numerous data elements that comprise alternate representations of a single piece of information, such as audio, text transcription of the audio, short-form summary of the text, and metadata concerning the story. Advantageously, each data element is presentation-independent, meaning that it does not require a particular type of presentation, such as HTML, WML, etc. Each content instance thus provides raw data, leaving the end-user free to access the data as desired. Specifications such as data type definitions (DTDS) may be used to prescribe that each story include the constituent data elements, e.g., text, audio, short-form text, metadata, etc. The DTDs define a dialect of extensible Markup Language (XML). Further, different DTDs prescribe the format of each data element. A developer may also define further DTDs defining additional data elements, sub-elements, sub-sub-elements, and the like.

29 Claims, 13 Drawing Sheets

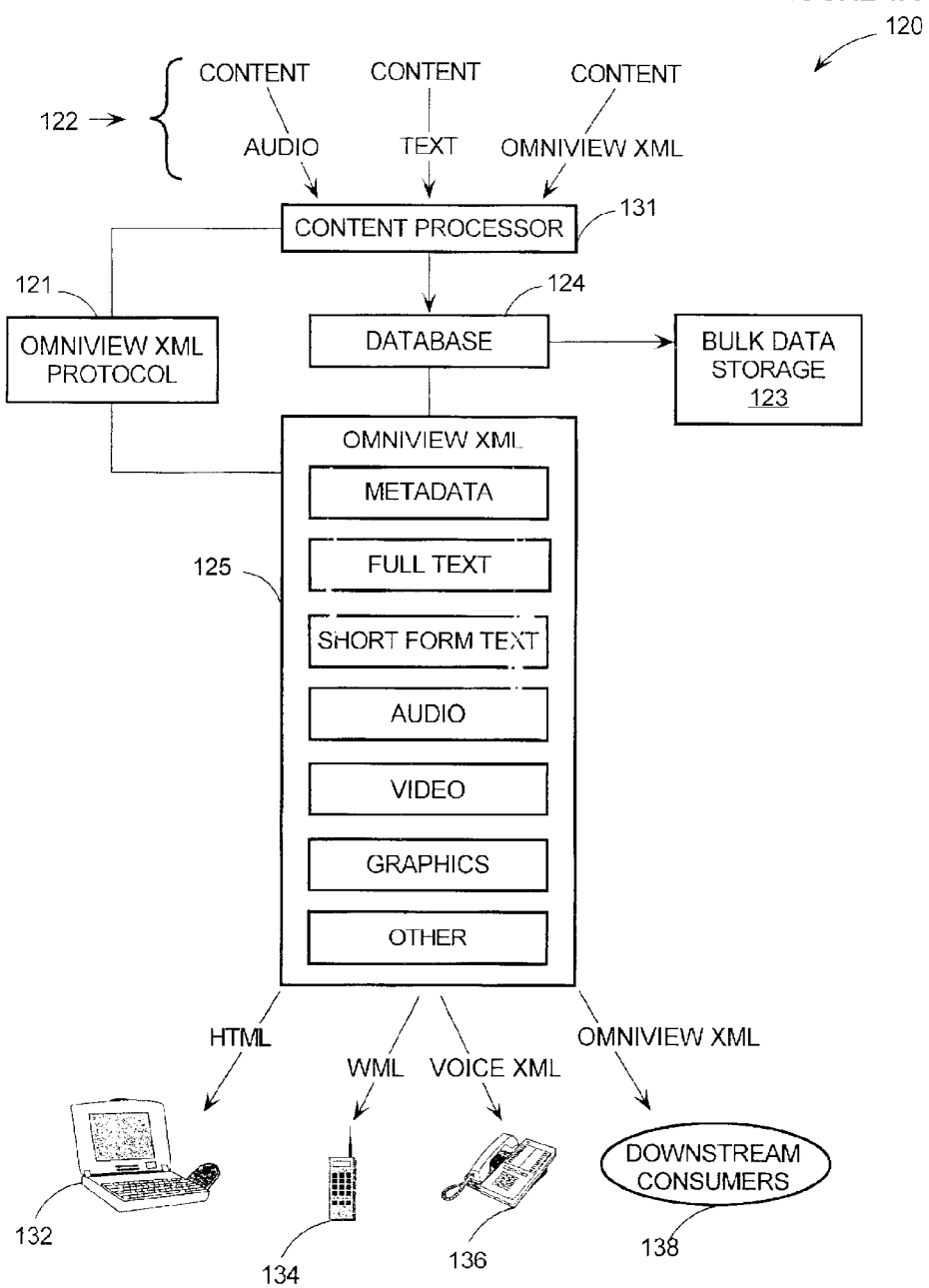

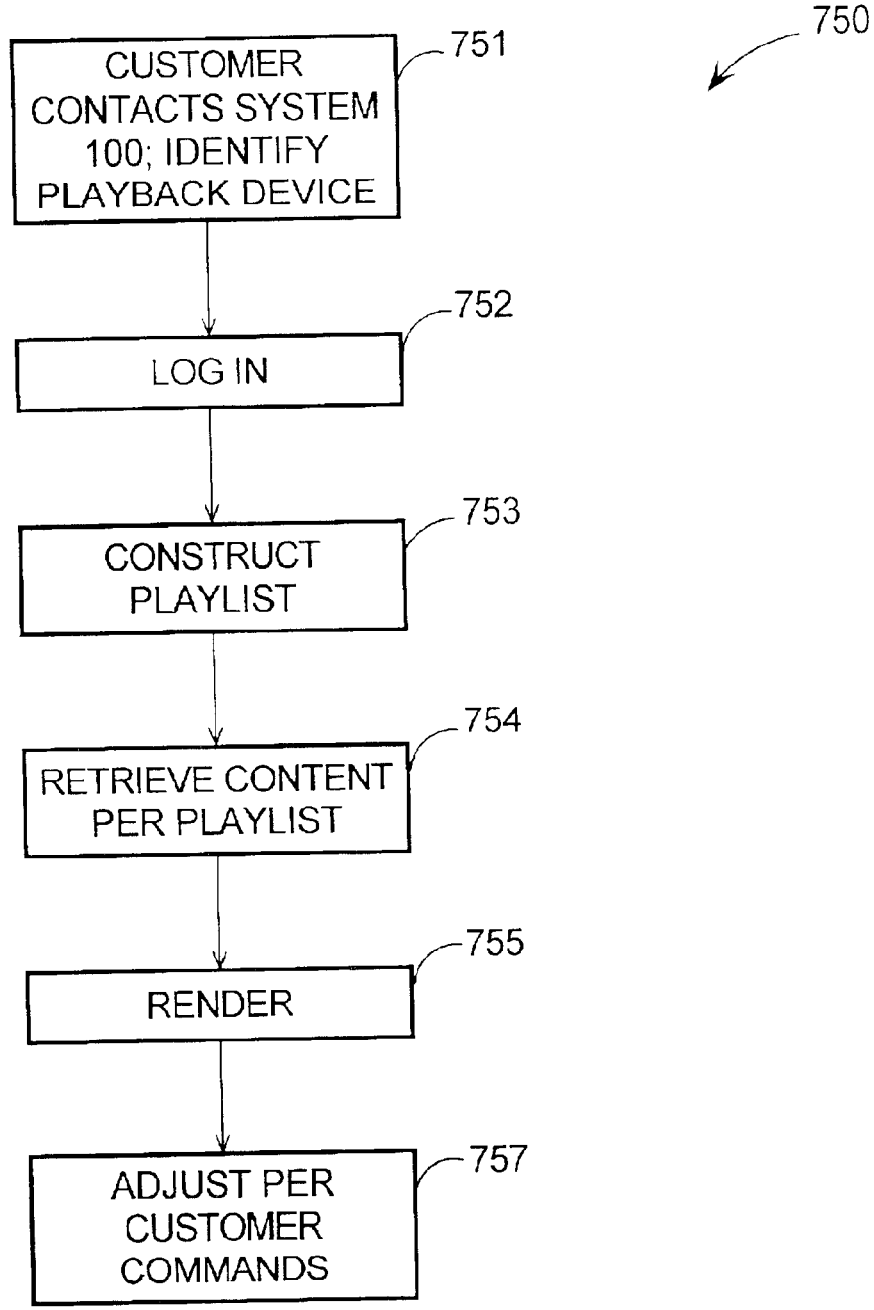

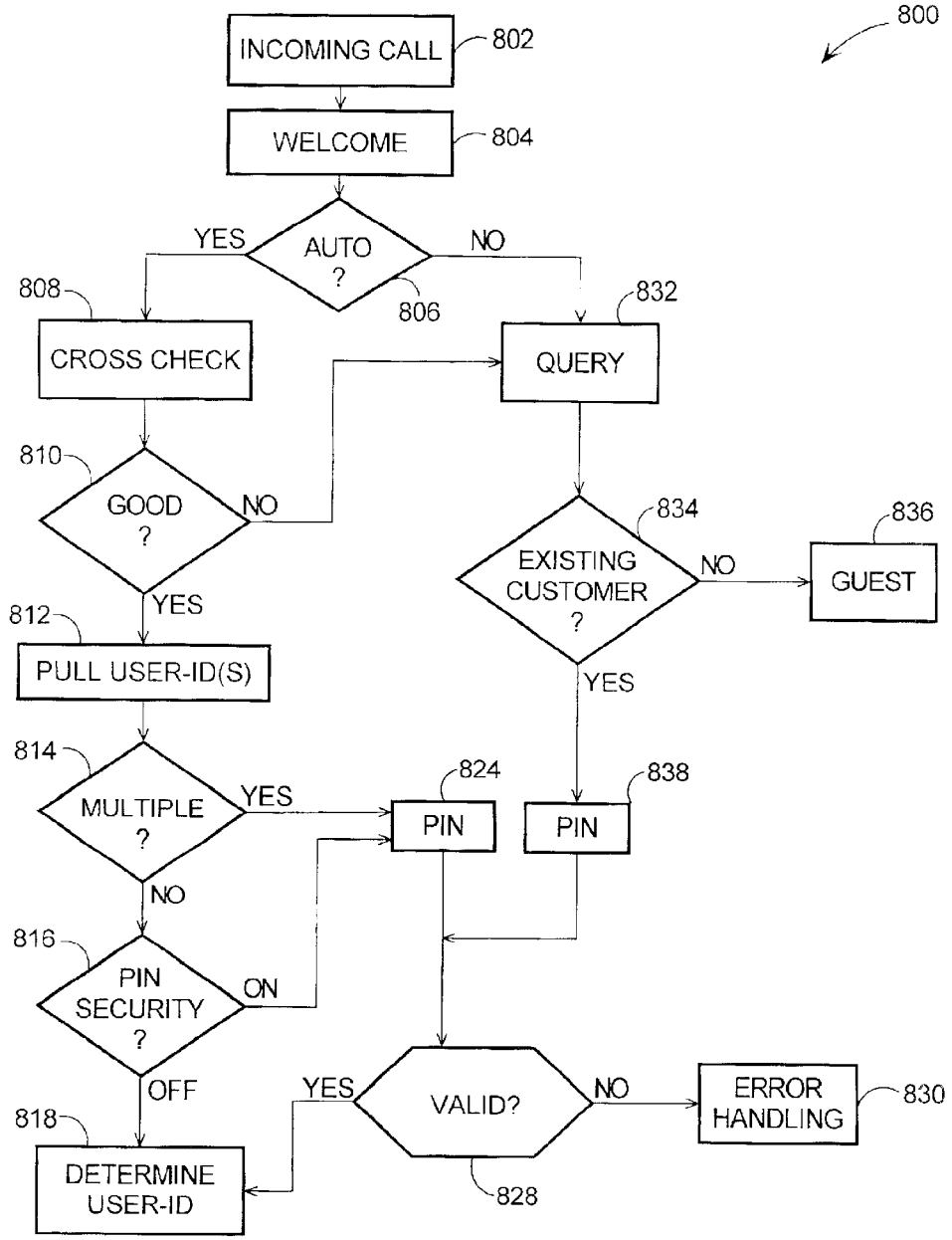

SYSTEM AND METHOD FOR CONSTRUCTION, STORAGE, AND TRANSPORT OF PRESENTATION-INDEPENDENT MULTI-MEDIA CONTENT

CROSS-REFERENCE TO RELATED APPLICATIONS

This application is a continuation-in-part of U. S. patent application Ser. No. 09/653,472, filed on Aug. 31, 2000 now U.S. Pat. No. 6,529,586 in the names of T. Todd Elvins, Robert T. Fassett, and Philip Shinn, entitled "System And Method For Gathering, Personalized Rendering, And Secure Telephonic Transmission of Audio Data," and presently assigned to INDICAST CORPORATION.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to data objects, and more particularly to a system and method for organizing, storing, and/or transporting multi-presentation content. In one implementation, the invention may be implemented using an extensible markup language, as shown by the disclosure of OmniViewXML given below.

2. Description of the Related Art

Over the years, various public and proprietary standards have arisen for storing and transporting multimedia information. As one example, numerous standards for lossy data compression and storage of full-motion video have been produced by the Motion Picture Experts Group of the International Organization for Standardization (ISO). These standards are collectively referred to as "MPEG." Different MPEG standards have evolved for different purposes, including MPEG-1 dealing primarily with audio and video compression for CD-ROM applications, MPEG-2 for more demanding applications including broadcasting, MPEG-3 for high-definition television, and MPEG-4 for distance learning, remote monitoring, home shopping, and other applications using slower transmission methods such as conventional phone lines.

From the standpoint of storing and transporting multimedia data, the MPEG format certainly does the job. For example, when used to encode a closed-captioned movie, an MPEG-formatted data object will include the diverse multimedia formats of video, audio corresponding to the video, and text matching the audio.

Although the MPEG standards serve the foregoing applications well, there are less aptly suited for other applications such as rapidly compiling varying data content at outlying sites and transmitting the data content for decomposition at a central facility. Such applications demand extensibility, presentation independence, and easy modification of encoded data. The MPEG standards are not "extensible" because their requirements are fixed, and users therefore cannot modify them. The MPEG standards do not yield presentation independence, because MPEG data objects are intended for presentation by a specific output device, such as WINDOWS compatible personal computer. The MPEG standards do not enable users to easily modify MPEG data, rather the underlying data must be changed and re-encoded into the MPEG format. The MPEG standards, then, do not provide the universality required of some applications requiring rapid assimilation transmission, and decomposition of data content.

In more direct consideration of the foregoing needs, the International Press Telecommunications Council developed NewsML, the News Markup Language. NewsML purports to be an XML based, media independent, structural framework for news, and aims to represent news in all the various stages of its life cycle in an electronic service environment. NewsML is intended for use in electronic news production, archiving, and delivery. With NewsML, no assumption is made about the media type, format, or encoding of news. It is said to provide a structure within which pieces of news media relate to each other, and may equally contain text, video, audio, graphics, and photos. NewsML takes the view that any medium can be the main part of a news-item, and that objects of all other types can fulfill secondary, tertiary, and other roles in respect of the main part. Hence, NewsML is said to allow for the representation of simple textual news-items, textual news-items with primary and secondary photos, the evening TV news with embedded individual reports, and so on.

Although NewsML enjoys growing commercial use today, and may even be satisfactory for many news reporting applications, software engineers at INDICAST CORPORATION ("INDICAST") have sought improvements over NewsML and other markup languages. INDICAST software engineers have discovered that the existing markup languages are insufficient to convey the particular types of information required to provide INDICAST with multi-view content. Chiefly, there is no community or commercial standard for storing or transporting identical information in different forms such as audio, a textural transcription of the audio, a short form text rendition summarizing the story, video, a graphics image, and cataloging metadata for organizing, storing, and searching the information. Therefore, as a particular example, content consumers such as voice portals receive content in different forms, at different times, and there is no correspondence between an audio story and the textual transcription of that story. This creates significant work in assembling and associating different presentations of the same story that arrive separately.

Consequently, known data storage/transportation formats are not completely adequate for these applications due to certain unsolved problems.

SUMMARY OF THE INVENTION

Broadly, the present invention concerns a system and method for organizing, storing, and/or transporting multi-presentation content. Another aspect of the invention is an information delivery system, configured to utilize such multi-presentation content in rendering output data to customers operating various "personal interfaces" as playback devices.

The invention provides extensible, multi-presentation content in human/machine readable form, where each content instance may contain numerous data elements that comprise different media types providing alternate representations of a single piece of information, such as audio, text transcription of the audio, short-form summary of the text, video, graphics, etc. Advantageously, each data element is presentation-independent, meaning that it does not require a particular type of presentation, such as HTML, WML, Voice XML, execution by a computer, etc. Each content instance thus provides raw data, leaving the end-user free to apply the data as desired.

In one embodiment, the invention is implemented as an application of XML (extensible Markup Language) called "OmniViewXML," which prescribes that each content instance include at least one of the constituent data elements (e.g., text, audio, short-form text, video, graphics, etc.) and that all data elements correspond to the same underlying piece of information. The requirements of each type of data element may be set forth by a specification and various DTDs (data type definitions), for example. Further, each content instance pertains to one of several predefined "topics" and honors the requirements of an associated topic DTD. A developer may also define further DTDs defining additional topics, or further refine the metadata DTD to define additional types of data elements.

The foregoing features may be implemented in a number of different forms. For example, the invention may be implemented to provide a method to organize, store, and/or transport multi-presentation data content. In another embodiment, the invention may be implemented to provide an apparatus such as a computer system programmed to organize, store, and/or transport multi-presentation data content as described herein. In still another embodiment, the invention may be implemented to provide a signal-bearing medium tangibly embodying a program of machine-readable instructions executable by a digital data processing apparatus to organize, store, and/or transport multi-presentation content according to this invention. Another embodiment concerns logic circuitry having multiple interconnected electrically conductive elements configured to operate as discussed herein.

The invention affords its users with a number of distinct advantages. For example, the invention provides a standardized mechanism for delivery of frequently updated content, such as stock quotes, news, traffic conditions, and sports scores. The invention is particularly well suited to frequently updated content because content retrieval and transport are seamless and automatic. Another advantage is that the invention provides an effective mechanism for delivering content from content producers to consumers in multiple media types appropriate for presentation upon a variety of different output devices. For example, a weather report may be delivered as a content instance including an audio file, a video file, a full text report, video, graphics, and a short text report. This content instance contains data appropriate for a web browser, a web-enabled phone, ordinary telephone, television, personal computer, or any other device after undergoing conversion to the presentation language appropriate to that device, e.g. HTML, WML, VoiceXML, etc. As a result, each user of a particular playback device receives the optimal content for that device—telephone users receive quality recorded audio, web-enabled phones receive abbreviated text, and personal computer users receive a full multimedia package. Advantageously, users encounter the same content and brand-name source regardless of access device, which helps content producers to ensure consistency among multi-modal devices, such as a web-enabled phone that switches from audio and visual interfaces.

As another benefit, the invention avoids the need to perform the process of transforming intermediate languages such as HTML, known as "screen scraping." Screen scraping is unnecessary because the invention utilizes raw content from the content producer, enabling the richest possible user experience. As still another benefit, a user's keyword search yields the same results, regardless of which type of device the user has. This is because text, audio, video, graphics, and short-form text views of a data element all share the same metadata. Moreover, content can be marked as having been read regardless of which media type was actually used. Namely, if a user obtains one view of a piece of information, such as short-form text via web-enabled phone, components of the invention mark that content instance as "read" regardless of whether the user later logs-in with a different playback device such as a non-web phone, landline phone, web TV, or any other device.

The invention also provides a number of other advantages and benefits, which should be apparent from the following description of the invention.

BRIEF DESCRIPTION OF THE DRAWINGS

FIG. 1A is a block diagram illustrating the flow of incoming content and outbound to a variety of playback devices.

FIG. 7B is a flowchart showing an operational sequence for conducting a playback session for a telephone, according to the invention.

FIG. 8 is a flowchart showing a log-in sequence of the playback session in greater detail, according to the invention.

DETAILED DESCRIPTION

Figure 1B:
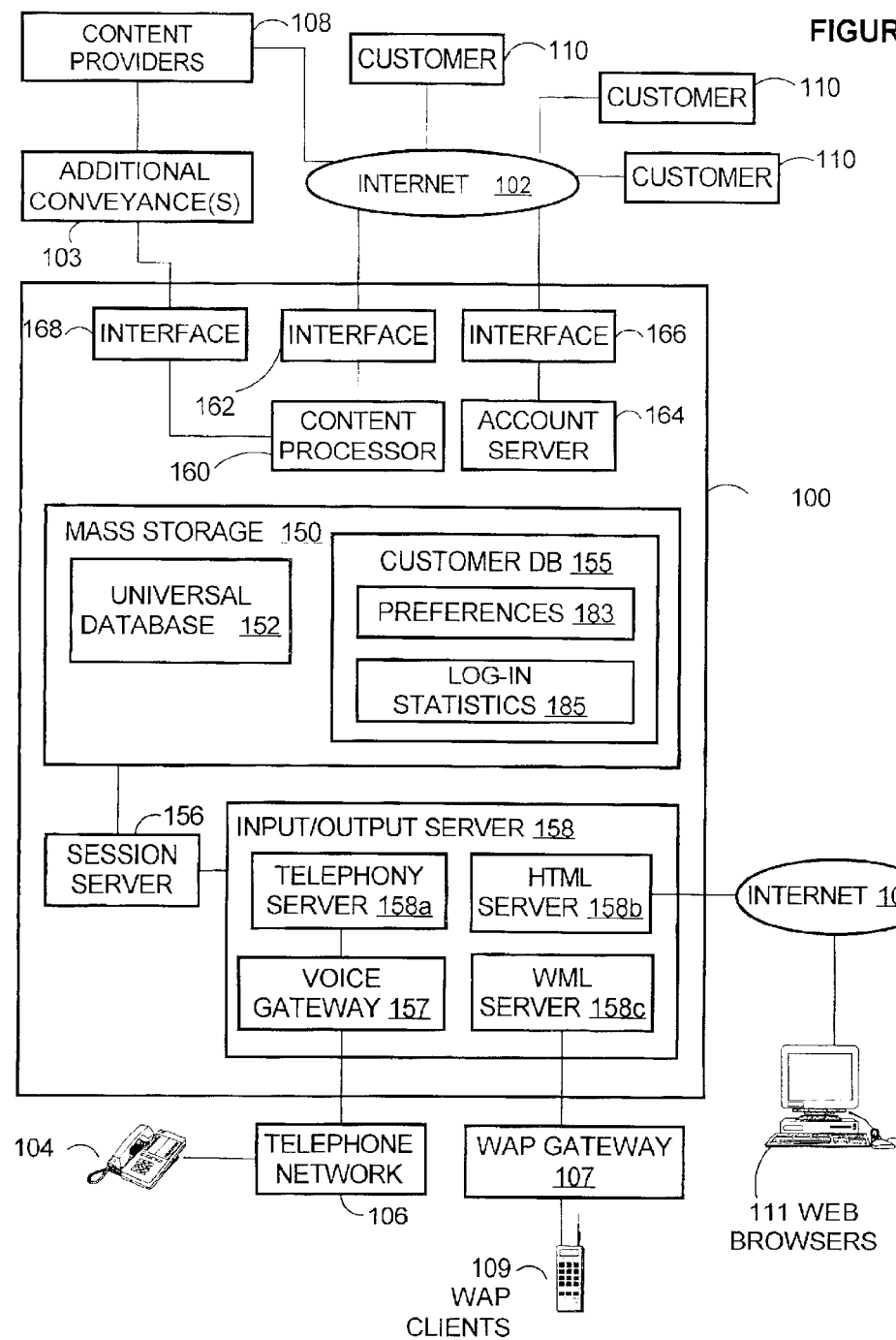
FIG. 1B is a block diagram of the hardware components and interconnections of a multimedia content delivery system according to the invention.

The nature, objectives, and advantages of the invention will become more apparent to those skilled in the art after considering the following detailed description in connection with the accompanying drawings.

Hardware Components & Interconnections
Accumulation/Distribution of Multi-Presentation Content One aspect of the present invention concerns a system for construction, storage, and/or transport of "multi-presentation content." Multi-presentation content comprises a number of different data elements representing the same underlying data, but where each data element is of a different media type. In the presently illustrated example, media types include audio, full text (text-transcription of the audio), short-form text, graphics, and video. Without departing from the present invention, additional media types may be utilized, such as "tagged" text (text having its different elements formatted by start/end tags), "mixed" format (multiple different media types), "file" format (identification of a storage file), etc.

More particularly, FIG. 1A illustrates various components of the invention in broad view. In a content delivery system 120, a content processor 131 receives content 122 from various content providers. Content may be received in various individual media types, such as audio from one content provider, text from another provider, etc. In addition, some or all content providers may provide data in the multi-presentation formation of this invention, referred to as OmniViewXML. Incentives for content producers to use OmniViewXML include, for example, (1) greater value of data to consumers such as the system 120 because of the ease of using the underlying data, (2) greater value to the system 120 and other consumers because of the flexibility in choosing between different multimedia types, (3) requirements imposed by the system 120 upon the content providers to supply data in OmniViewXML compliant form The details of OmniViewXML format are defined by an OmniViewXML protocol by 121, which is available for use by the content processor 131 when receiving OmniViewXML data from the content providers 122. The protocol 121 may comprise, for example, a specification along with various DTDs or data schema. A collection of one or more data objects complying with the OmniViewXML protocol is referred to as a "content instance." In the illustrated example, an OmniViewXML content instance contains one or more data elements of different media types, such as metadata, text, short form text, audio, video, graphics, and others. Each content instance may include some or all of these multiple media types. OmniViewXML requires that the data elements represent different embodiments (media types) of the same underlying piece of information. Each content instance also includes metadata providing information applying to all data elements representing this content.

The content processor 131 accumulates received content into a database 124, where the content is stored. The database 124 may employ various conventional formats for data storage, or in the alternative, or in the alternative, the OmniView XML format may be used in the database 124. The system 120 utilizes bulk data storage 123 to store machine-readable content, such as audio files (e.g., WAV, RA, and similar formats), video files (e.g., MPEG, RA, and the like), graphics (e.g., JPEG, TIF, RTF, BMP, and the like), etc. A pointer in the database 124 identifies corresponding machine-readable data in the bulk data 123. Pointers may comprise filenames, numeric identifiers, universal resource locators (URLs), etc. Again, data may reside in the database 124 in conventional database formats (such as a relational database), or in OmniViewXML if desired.

Regardless of whether OmniViewXML format is used for receiving content, storing content, or neither, the OmniViewXML format may be used to format content recalled from the database 124 to aid in subsequent playback to users. Particularly, various servers 125 (described below) selectively retrieve data from the database 124 according to demand from different users via personal interfaces 132, 134, 136, 138. The servers 125 place data from the database 124 in OmniViewXML format to ease the subsequent rendering of data to the diverse array of personal interfaces 132, 134, 136, 138. Rendering of data is conducted efficiently because OmniViewXML stores data in a presentation independent format. Thus, the components of the server 125 that manage the actual presentation of data to users can easily render data to user playback devices by extracting presentation independent content from the OmniViewXML content and reformatting the data appropriate to the user's playback device. For instance, the system 120 may use the same OmniViewXML content instance to render output to a personal computer 132 in HTML format, a web-enabled phone 134 in WML, a wireless or landline phone 136 in VoiceXML, etc.

As an additional feature of the invention, OmniViewXML provides a convenient and efficient format for use in the sale, lease, sharing, or other distribution of content to downstream content providers 138. In other words, content may be placed in OmniViewXML format prior to downstream distribution of the content.

Multimedia Information Delivery System: Introduction

FIG. 1B describes an implementation of the system 120 in greater detail. The system 100 is shown in the context of various other peripheral components external to the system 100. Broadly, the system 100 is operated by an information delivery agency and serves to continually collect electronic data from the content providers 108 via the Internet 102 and/or additional conveyances 103. Responsive to customer requests, the system 100 selectively retrieves data from local stores in areas of interest to the inquiring customers, formats the data, and transmits the data to customer's playback devices such as 104, 109, 111. As a specific example, the data may be transmitted in audio form to the callers' telephones 104 via telephone networks such as 106. As explained below, the system 100 can rapidly convey information to customers because the underlying data is pre-collected; also, in the case of telephone output, there is a high speed, non-Internet connection between the system 100 and the customer's telephone 104. In this sense, the system 100 exhibits a "minimum latency architecture."

Content Providers

Referring to FIG. 1B in greater detail, the content providers 108 are computer-equipped suppliers of electronic information in various subject areas. In some cases, the content providers 108 may be underlying sources of data, such as magazine or newspaper publishers, content syndicators, or radio producers. Some specific examples include Reuters™ news service, the New York Times™ newspaper, Time™ magazine, ABC News™, etc. In other cases, the content providers 108 may be entities that relay and/or possibly assemble information generated by others, one example being Lexis-Nexis™.

Customers

In addition to the content providers 108, the system 100 also interacts with customers 110. Certain aspects of this interaction occur over the Internet 102, with the customers 110 using personal computers, web-TV units, web-enabled phones, personal information devices, and other electronic Internet access devices (referred to collectively as "personal computers"). As shown below, customers 110 communicate with the system 100 from their personal computers in order to establish various customer "preferences" for future "playback" sessions in which they receive personalized content from the system 100.

Conveyances

The system 100 gathers information from the content providers 108 and the customers 110 through various conveyances, including the public Internet 102 as well as any additional conveyances 103. The additional conveyances 103 may include news wire, satellite feed, cable, stock ticker, e-mail, dedicated telephone line, dial-up connection, or any other medium suitable for transmission of electronic information as discussed herein. Accordingly, the system 100 includes network cards, modems, intelligent channels, radio transceivers, or other suitable devices to implement interfaces 168, 162, 166, enabling components of the system 100 to interact with the Internet 102 and the conveyances 103. The system 100 may also receive data that is manually entered by staff of the information delivery agency after retrieval from the content providers 108 via automated means or manual conveyances such as postal delivery, courier, overnight mail, fax machine, etc.

Content Processor

Within the system 100, the content processor 160 gathers information from the content providers 108. Such gathering may include actively obtaining information, passively receiving data, a combination of both, etc. As explained below, the content processor 160 continually gathers information in predefined areas, irrespective of the customers' preferences. The content processor 160 stores the gathered data in a universal database 152 contained in mass storage 150. To provide one illustrative example, the content processor 160 may be implemented with one or more personal computers, servers, workstations, mainframe computers, etc.

Mass Storage

Although the mass storage 150 may be configured in a variety of ways according to this invention, one example includes a universal database 152 implemented in a network-attached storage device such as a NetApp F700 model Network Appliance brand filer. To minimize the number of concurrent connections and thereby conserve the costs required to operate the database 152, especially cumbersome files (such as large, audio, video, machine-only-readable files, or other files) may be stored outside the database 152. For instance, a data file may be identified in the database 152 by storage path and filename, with the actual file contents being stored external to the database 152 structure (such as bulk data storage 123 as described above). For this reason, components such as the session server 156 and output server 158 (described below) may access desired content without overburdening the database 152 structure, thereby improving operating efficiency.

As illustrated, the storage 150 also includes a customer database 155. As shown below, the customer database 155 contains information regarding each customer's identity, account data, preferences, etc. Particularly, the customer database 155 contains preferences 183 and a log-in statistics 185. As shown below in greater detail, the preferences 183 include each customer's preferred content, playback order, etc. The log-in statistics 185 include information uniquely identifying each customer, along with personal identification numbers and other appropriate codes. Customer data in the preferences 183 and log-in statistics 185 may be indexed by User-IDs, which are more fully explained below.

Account Server

The account server 164 interacts with customers 110, assisting them in preference choice, account setup, etc. Chiefly, the account server 164 interacts with customers' personal computers via the Internet 102, guiding customers 110 through the process of establishing and later reconfiguring their customer accounts. In this respect, one particularly useful implementation of the account server 164 is a worldwide web server, which presents an interactive "web" page. The account server 164 may also receive account setup/reconfiguration data from other sources, such as web-enabled phones, computers with direct dial-ups, or human agents of the information delivery agency that take the customer's data over the telephone, facsimile, e-mail, postal service, etc. To provide one illustrative example, the account server 164 may be implemented with one or more personal computers, servers, workstations, mainframe computers, etc.

The account server 164 maintains customer data in the customer database 155, which is shown as part of the storage 150 to illustrate one example of efficient storage use. Alternatively, the account server 164 may utilize a different source of storage, such as its own hard disk drive, a separate external storage device, remote storage, etc.

Session Server and Other Components

In contrast to the information gathering and account setup services of the content processor 160 and account server 164, the session server 156 responds to incoming playback requests from enrolled customers and provides them with selected information from the mass storage 150 according to the individual customers' preferences previously defined through the account server 164. This process is described in greater detail below. To provide one illustrative example, the session server 156 may be implemented with one or more personal computers, servers, computer workstations, mainframe computers, etc.

The session server 156 interacts with an input/output (I/O) server 158, which outputs content provided by the session server to the user's personal interface such as 104, 109, 111. In the illustrated example, the I/O server 158 includes various subcomponents appropriate to different multimedia forms. Namely, the illustrated I/O server 158 includes (1) a telephony server 158a coupled to a voice gateway 157 coupled to a telephone network 106, (2) an HTML server 158b coupled to the Internet 102, and (3) a WML server 158c coupled to one or more WAP gateways 107.

More particularly, the telephony server 158a may comprise a telephone interface component that connects the session server 156 to a voice gateway 158a, in turn coupled to the Public Switched Telephone Network (PSTN). Accordingly, one example of the telephony server 158a is a Dialogic brand line interface card, such as a D240SCT1 voice card installed in an Intel-based personal computer. To accommodate many concurrent incoming calls, the telephony server 158a may include switching equipment to receive calls upon many different telephone numbers. An example of the voice gateway 158a is the commercially available MOTOROLA brand VOICE DEVELOPER GATEWAY product.

Telephone networks such as 106 enable customers to access the servers 156, 158 from their telephones 104. In the case of wireless telephones, one embodiment of the telephone network 106 comprises a suitable cellular network and the infrastructure of the PSTN and long distance network(s) necessary to complete customers' calls to the I/O server 158. For customers calling from landline phones, the telephone network 106 includes the applicable PSTN and long distance network(s) needed to complete the customer's call.

The HTML server 158b comprises an Internet web server to receive customer's information requests submitted via web browsers 111. Accordingly, the web server 158b is coupled to the Internet 102. Although HTML is given as one example, the server 158b may use one or more alternative presentation languages such as XML, SGML, etc. Further description of Internet web hosting applications are omitted, as such equipment and its operations are well known in the art, and the applicable implementations will be apparent to those of ordinary skill in the art, having the benefit of this disclosure.

The WML server 158c is coupled to one or more WAP gateways 107, which are in turn coupled to the data communication channels of one or more cellular telephone networks (not shown). The server 158c presents short form text or low graphics versions of contact for relay to WAP clients 109 by the gateway 107. Alternatively, the server 158c may be coupled to the Internet 102, with the WAP gateway 107 receiving data from the server 158c via the Internet 102. The WAP server 158c may output information in WML; or alternatively, information may be output in HTML or another markup language that is converted into WML by the WAP gateway 107.

Exemplary Digital Data Processing Apparatus

The computer-based processors and servers of the invention may be implemented with various hardware components and interconnections. For example, each of the components 160, 164, 156, and 158 may be implemented with a separate digital data processing apparatus. Alternatively, some or all of these components may be consolidated by implementation of a single, albeit more powerful, digital data processor.

Figure 2:
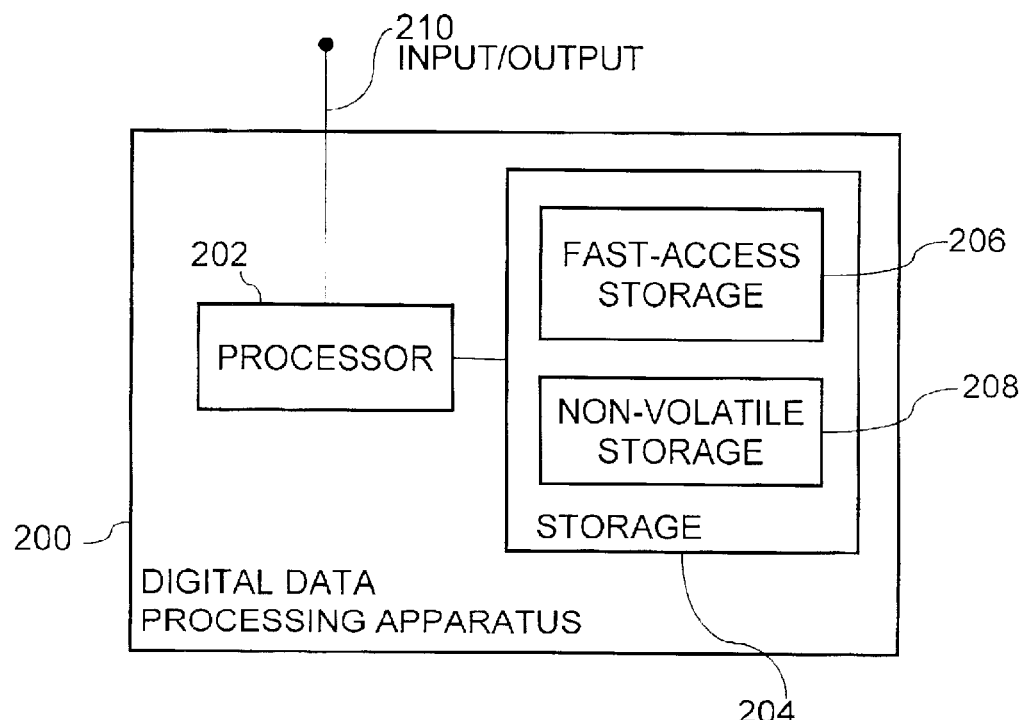
FIG. 2 is a block diagram of a digital data processing machine according to the invention.

In either case, FIG. 2 depicts an exemplary digital data processing apparatus 200. The apparatus 200 includes a processor 202, such as a microprocessor or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data storage apparatus discussed previously, some or all of the components 160, 164, 156, 158 may use logic circuitry instead of computer-executed instructions. Depending upon the particular requirements of the application in the areas of speed, expense, tooling costs, and the like, this logic may be implemented by constructing application-specific integrated circuits ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

Operation

Having described the structural features of the present invention, the method aspect of the present invention will now be described. Although the present invention has broad applicability to the delivery of information services, the ensuing description is particularly suited to the specifics of the structure that has been described above, and the explanation that follows will emphasize such an application of the invention without any intended limitation. Broadly, the invention concerns a system and method for organizing, storing, and/or transporting multi-presentation content, which may be optionally implemented a content delivery system configured to utilize such multi-presentation content in rendering output data to customers operating various playback devices.

Signal-Bearing Media

In the context of FIG. 1B, such a method may be implemented, for example, by operating the system 100, as embodied by one or more digital data processing apparatuses 200, to execute respective sequences of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform operations as described herein.

Figure 3:
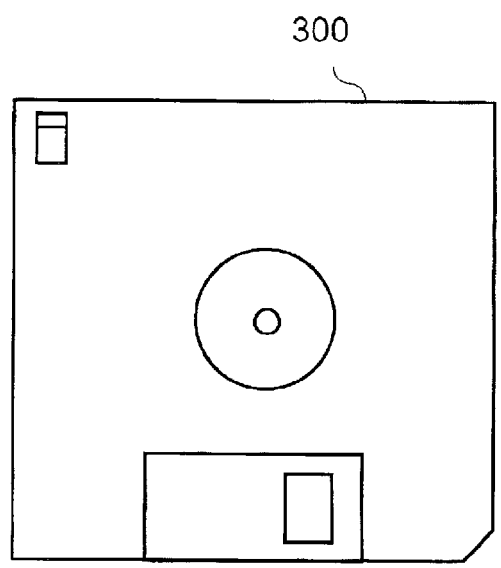
FIG. 3 shows an exemplary signal-bearing medium according to the invention.

As one option, this signal-bearing media may comprise, for example, RAM (not shown) contained within appropriate sites of the system 100. Alternatively, the instructions may be contained in another signal-bearing media, such a magnetic data storage diskette 300 (FIG. 3), directly or indirectly accessible by the processor 202. Whether contained in the storage 206, diskette 300, or elsewhere, the instructions may be stored on a variety of machine-readable data storage media, such as direct access storage (e.g., a conventional "hard drive", redundant array of inexpensive disks ("RAID"), or another direct access storage device ("DASD")), magnetic tape, electronic read-only memory (e.g., ROM, EPROM, or EEPROM), optical storage (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise software object code, compiled from a language such as "C," etc.

Logic Circuitry

In contrast to the signal-bearing medium discussed above, certain aspects of the invention may be implemented using logic circuitry, instead of using a processor to execute instructions. In this embodiment, the logic circuitry is used to implement one or more of the components 160, 164, 156, 158 according to the method of the invention. The logic circuitry may be implemented using many different types of circuitry, as discussed above.

OmniViewXML Protocol

A discussion of the OmniViewXML protocol is beneficial prior to illustrating the operation of the invention in detail. OmniViewXML includes a specification (described below) and a hierarchy of XML DTDs. In one embodiment, this hierarchy consists of a root metadata DTD and various subsidiary topic DTDs corresponding to traffic, headline news, financial ticker, entertainment, sports, weather, and horoscopes. Optionally, for content types in areas where an accepted XML standard already exists, that DTD may be incorporated into an OmniViewXML topic DTD. One example is the OmniViewXML News DTD, which may incorporate the known News Industry Text Format (NITF) DTD. The list of topic DTDs is intended to grow as more content types are defined. The OmniViewXML metadata DTD (described below) also contains a section that allows new content providers to define the schema for their content, so that they can deliver their content using OVXML even if a DTD for their content is not yet part of the OVXML hierarchy.

Thus, OmniViewXML provides various XML DTDs, dictating the format of compliant content instances, these DTDs constituting the protocol 121. In addition to the metadata and topic DTDs, the OmniViewXML protocol also includes a specification that sets forth requirements for all content instances, these requirements applying regardless of which DTDs are used by any particular content instance. In the following example, there is a different DTD for topic. Namely, referring to TABLE 1A, the DTDs include a traffic DTD, headline news DTD, sports DTD, financial ticker DTD, entertainment DTD, and weather DTD. A metadata DTD overlies all topic DTDs, and the OmniViewXML Specification applies to all DTDs.

TABLE 1A

OMNIVIEW XML
OMNIVIEW XML SPECIFICATION
METADATA.DTD

| topic DTD (traffic) | topic DTD (headline news) | topic DTD (financial ticker) | topic DTD (entertainment) | topic DTD (sports) | topic DTD (weather) |
|---|---|---|---|---|---|

In this hierarchy, each topic DTD includes zero or more data elements, where each data element corresponds to a different media type. However, in practice, each DTD include at least one data element. The top level element of the metadata DTD is the "resource" element, called "ovxml-resource." This element prescribes a listing of various bibliographic information and other metadata concerning content which may be included and used by compliant topic DTDs. The ovxml-resource element includes elements such as title, creator, subject, description, publisher, distributor, contributor, date-time, release, expiration, classification, format, source, identifier, revision, series, language, relation, location, legal rights, and the like. Thus, by invoking the ovxml-resource element of the parent metadata DTD, a topic DTD requires that content instances of that topic DTD include bibliographic information adhering to the ovxml-resource protocol.

As mentioned above, the OmniViewXML hierarchy has a metadata DTD at its root. APPENDIX A, below, shows the content of one exemplary implementation of the metadata DTD, listed by the name "ovxml-resource.dtd".

Among other things, the metadata DTD defines the tags that describe the general attributes of content instances. The metadata DTD also prescribes the different multimedia types, which include (in this example) audio, video, full text, short text, graphics, video, file, and other. In the metadata DTD, these elements are in the "media.list" parameter entity. In the topic DTDs, references to the "media.list" parameter entity are contained within elements that end in "-media". This element may contain one element pointing to an audio file with a recording of the content, one element pointing to a video file with a recording of the content, one element delimiting a full text version of the content, one element delimiting a short text version of the content, one element pointing to an image file with the content, one element pointing to a file depicting the content in an alternate format, and one mixed element which allows an arbitrary combination of any of these formats, where the combination taken as a whole represents the content. For example, the audio file within the "-media" element contains an audio version of the tagged content that appears at the same level as the "-media" element. The tagged content may be the top of a hierarchy of tagged content.

In the present example, the multimedia representations are prescribed by the parameter entity "media.list," which anticipates the following media types: audio, video, image, full-text, short-text, file, and mixed. For each media type, the metadata DTD anticipates various properties. In the case of audio media types, the metadata DTD anticipates properties such as the following, as set forth by the metadata DTD's "omt:audio" attribute list: mimetype, source, number of bytes, duration, sample rate (Hertz), sample size (bits), channels, encoding, etc. Another example is image media types, for which the metadata DTD anticipates properties such as the following, as set forth by the metadata DTD's "omt:img" attribute list: mime type, source, size (bytes), height, width, alignment, etc. Other media types are explained by the following attribute lists, shown below in APPENDIX A: omt:video, omt:full-text, omt:short-text, omt:file, and omt:mixed.

The document element of the metadata DTD is "ovxml-resource", and the document elements of all the branch DTDs begin with "ovxml-" (for example: "ovxml-quotes", "ovxml-weather", "ovxml-news", etc.) Each of the content-specific branch DTDs of OmniViewXML make use of the metadata DTD. The document element of the content specific DTDs has "ovxml-resource", the document element of the metadata DTD, as its first child element. These first-level metadata define the values for the entire content unless overridden by lower level metadata. The second child is usually the first of several content-specific elements. Some of these content-specific elements, or some of their descendants, may have the metadata document element as an optional first child element. This allows that element to override some or all of the metadata specified at the top of the document, or to specify metadata that is only applicable at this level.

Depending upon the specific application, some or all branch DTDs may follow the general structure shown in TABLE 1B, below.

TABLE 1B

BRANCH DTD GENERAL STRUCTURE

<!ELEMENT ovxml-content ( ovxml-resource, content-specific+ ) >
<!ELEMENT content-specific ( ovxml-resource?, content-specific-media?, tagged-content? ) >

In this example, element "ovxml-content" is the document element of a content specific OVXML DTD, and its first child is the OVXML metadata DTD document element: "ovxml-resource". It is followed by one of more "content-specific" elements. Each of these has an optional "ovxml-resource" metadata DTD (used to override or add to the metadata specified in the parent element), and is followed with elements that contain the content in its multi-modal representations (under the "content-specific-media" element) and as tagged text (under the "tagged-content" element). The OVXML metadata DTD is defined in the "ovxml-resource.dtds" file. Its document element is "ovxml-resource".

Rather than including all information on a single level, each topic DTDs may define a hierarchy for storing data in content instances of that topic. In one example, the entire hierarchy may be defined in the topic DTDs themselves. Alternatively, each topic DTDs may refer to one or more hierarchically inferior DTDs, thereby shortening the parental topic DTD. For example, the sports topic DTD may include a subsidiary sports score DTD, sports story DTD, etc.

Figure 4A:
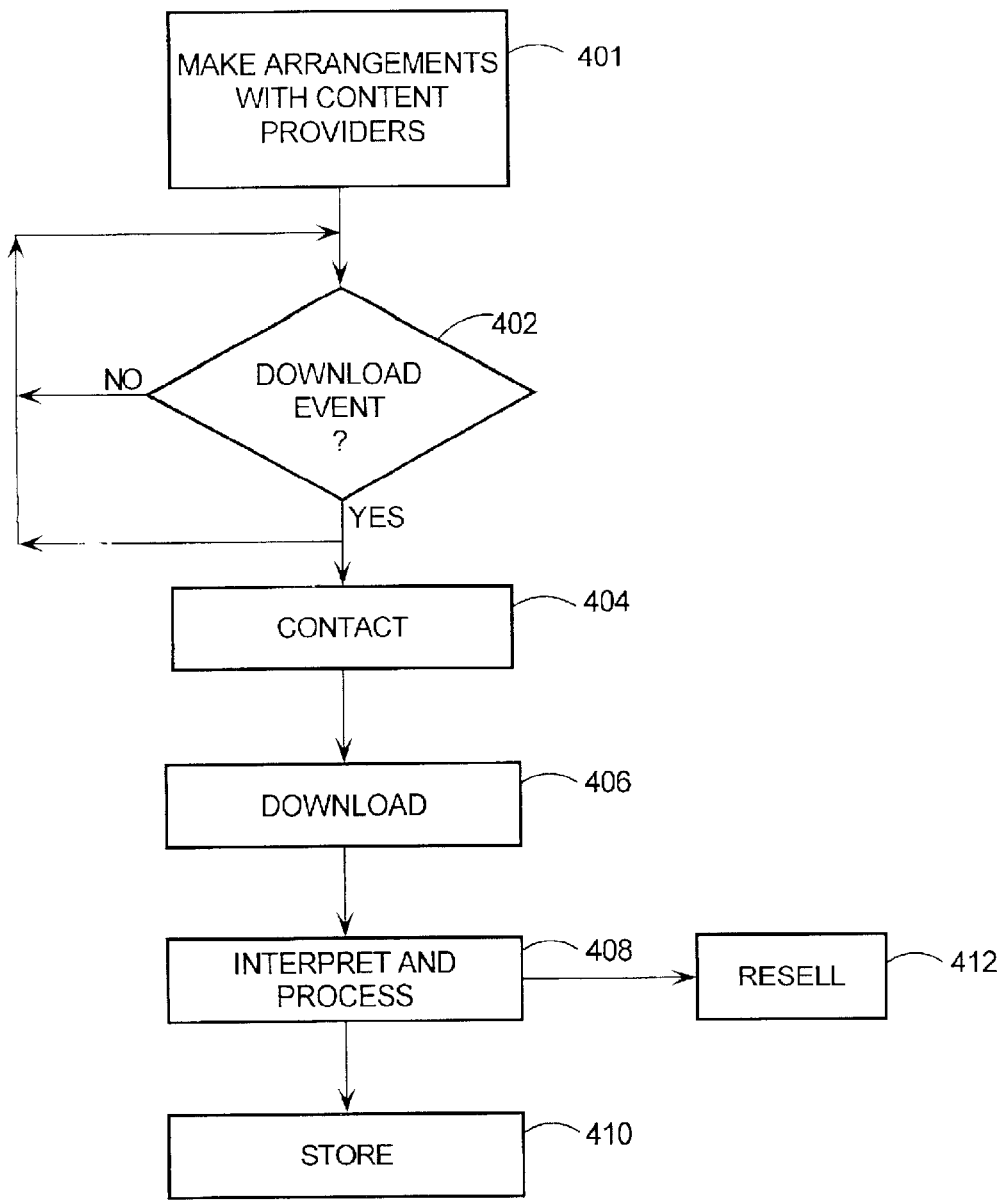
FIG. 4A is a flowchart of an operational sequence for obtaining content according to the invention.
Figure 4B:
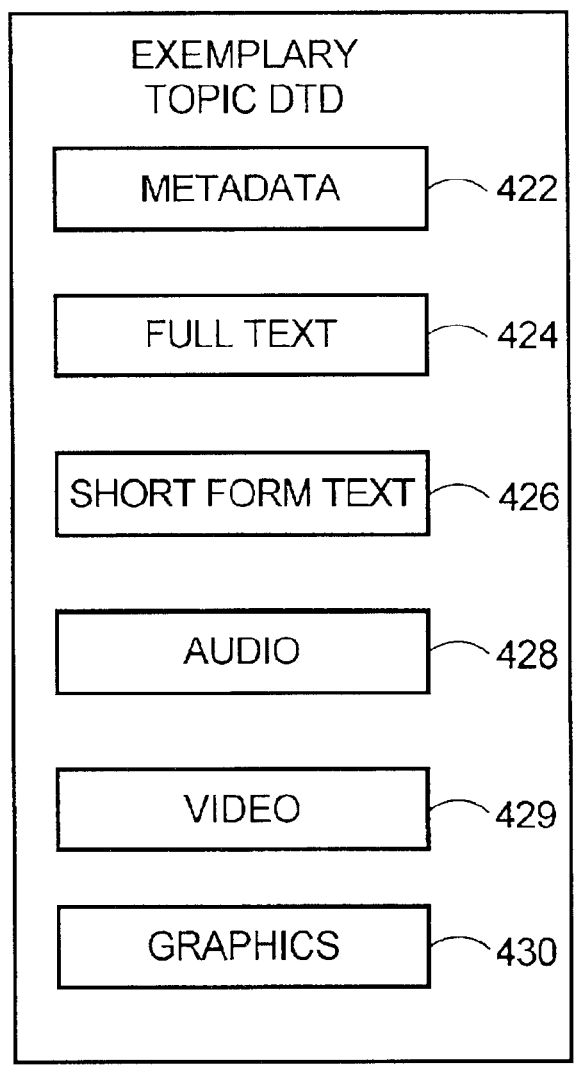
FIG. 4B is a block diagram showing an exemplary DTD to implement multi-presentation content instances according to the invention.
Figure 4C:
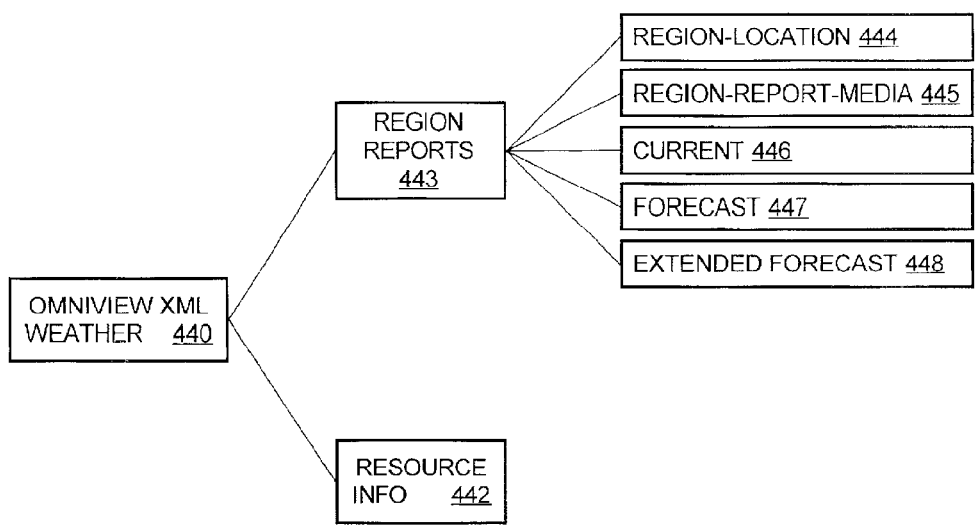
FIG. 4C is a block diagram showing a hierarchy of topic and sub-topic DTDs for a weather topic, according to the invention.

To further illustrate the hierarchic relationship of a topic DTD and its progeny, FIG. 4C shows an exemplary weather topic DTD 440. The weather topic DTD 440 prescribes that a conforming content instance includes resource information 442, and various region reports 443, and that each region report includes a region-location 444, region-report-media 445, current 446, forecast 447, and extended forecast 448. TABLE 2, below, shows an exemplary XML listing representing the weather DTD 440.

TABLE 2

WEATHER DTD

```
<!ENTITY % ovxml-resource SYSTEM
    "file:///data/indicast/website/dtds/ovxml-resource.dtd" >
%ovxml-resource;
<!ELEMENT owt:ovxml-weather ( omt:ovxml-resource, owt:region-
report*,
    owt:weather-desc* ) >
<!ATTLIST owt:ovxml-weather
    xmlns:omt CDATA #FIXED
        "file:///data/indicast/website/dtds/ovxml-resource.dtd"
    xmlns:owt CDATA #FIXED
        "file:///data/indicast/website/dtds/ovxml-weather.dtd" >
<!ELEMENT owt:region-report ( omt:region-location, owt:region-report-
media?,
    (owt:current, owt:forecast*)? ) >
<!-- One audio file here contains a weather report for one region. -->
<!ELEMENT owt:region-report-media ( %omt:media.list; ) >
<!ELEMENT owt:current ( omt:date-time, owt:temperature*, owt:weather-
    data? ) >
<!ELEMENT owt:forecast ( omt:date-time, (owt:temp-high, owt:temp-
    low)*, owt:weather-data? ) >
<!ELEMENT owt:weather-data ( owt:dewpoint*, owt:rel-humidity?,
    owt:wind-speed*, owt:visibility*, owt:weather-code?,
    owt:barometer*, owt:sunrise?, owt:sunset? ) >
<!ELEMENT owt:temperature (#PCDATA) >
<!ATTLIST owt:temperature
    units ( F | C | K ) "F"
    e-dtype NMTOKEN #FIXED "decimal" >
<!ELEMENT owt:temp-high (#PCDATA) >
<!ATTLIST owt:temp-high
    units ( F | C | K ) "F"
    e-dtype NMTOKEN #FIXED "decimal" >
<!ELEMENT owt:temp-low (#PCDATA) >
<!ATTLIST owt:temp-low
    units ( F | C | K ) "F"
    e-dtype NMTOKEN #FIXED "decimal" >
<!ELEMENT owt:dewpoint (#PCDATA) >
<!ATTLIST owt:dewpoint
    units ( F | C | K ) "F"
    e-dtype NMTOKEN #FIXED "decimal" >
<!ELEMENT owt:rel-humidity (#PCDATA) >
<!ATTLIST owt:rel-humidity
    e-dtype NMTOKEN #FIXED "decimal" >
<!ELEMENT owt:wind-speed (#PCDATA) >
<!ATTLIST owt:wind-speed
    units ( kph | mph ) "mph"
    direction ( N | S | W | E | NW | NE | SW | SE ) #REQUIRED
    e-dtype NMTOKEN #FIXED "decimal" >
<!ELEMENT owt:visibility (#PCDATA) >
<!ATTLIST owt:visibility
    units ( km | miles ) "miles"
    e-dtype NMTOKEN #FIXED "decimal" >
<!ELEMENT owt:weather-code EMPTY >
<!ATTLIST owt:weather-code
    code IDREF #REQUIRED >
<!ELEMENT owt:weather-desc (#PCDATA) >
<!ATTLIST owt:weather-desc
    code ID #REQUIRED
    e-dtype NMTOKEN #FIXED "string" >
<!ELEMENT owt:barometer (#PCDATA) >
<!ATTLIST owt:barometer
    units ( inches | mb ) "inches"
    e-dtype NMTOKEN #FIXED "decimal" >
```

TABLE 2-continued

WEATHER DTD

```
<!ELEMENT owt:sunrise (%omt:date-type;) >
<!ATTLIST owt:sunrise
    %omt:date-type.att; >
<!ELEMENT owt:sunset (%omt:date-type;) >
<!ATTLIST owt:sunset
    %omt:date-type-att; >
```

TABLE 3, below, provides an exemplary OmniViewXML content instance honoring the weather DTD 440.

TABLE 3

EXEMPLARY INSTANCE OF WEATHER DTD

```
<ovxml-weather>
    <ovxml-resource>
        <title>Today's Weather Reports</title>
        <date-time>2000-04-03T12:00:00-0800</date-time>
    </ovxml-resource>
    <region-report>
        <region-location>
            <city code="SAN">San Diego</city>
            <state-or-province code="CA">California</state-or-
            province>
            <country code="US">United States</country>
        </region-location>
        <region-report-media>
            <audio
                src="http://example.com/audio/weather/weathsd.wav"
                mimetype="audio/x-wav"/>
        </region-report-media>
        <current>
            <temperature units="C">20</temperature>
            <weather-data>
                <wind-speed units="kph">3</wind-speed>
                <visibility units="km">5</visibility>
                <weather-code code="su"/>
            </weather-data>
        </current>
        <forecast>
            <date-time>2000-04-04T12:00:00-0500</date-time>
            <temp-high units="C">25</temp-high>
            <temp-low units="C">18</temp-low>
            <weather-data>
                <wind-speed units="kph">3</wind-speed>
                <visibility units="km">5</visibility>
                <weather-code code="pc"/>
            </weather-data>
        </forecast>
        <forecast>
            <date-time>2000-04-05T12:00:00-0500</date-time>
            <temp-high units="C">27</temp-high>
            <temp-low units="C">20</temp-low>
            <weather-data>
                <wind-speed units="kph">1</wind-speed>
                <visibility units="km">6</visibility>
                <weather-code code="su"/>
            </weather-data>
        </forecast>
    </region-report>
    <region-report>
        <region-location>
            <city code="LA">Los Angeles</city>
            <state-or-province code="CA">California</state-or-
            province>
            <country code="US">United States</country>
        </region-location>
        <region-report-media>
            <audio
                src="http://example.com/audio/weather/weathla.wav"
                mimetype="audio/x-wav" />
        </region-report-media>
        <current>
            <temperature units="C">24</temperature>
            <weather-data>
```

TABLE 3-continued

EXEMPLARY INSTANCE OF WEATHER DTD

```
            <wind-speed units="kph">2</wind-speed>
            <visibility units="km">1</visibility>
            <weather-code code="cl"/>
        </weather-data>
    </current>
    <forecast>
        <date-time>2000-04-04T12:00:00-0500</date-time>
        <temp-high units="C">28</temp-high>
        <temp-low units="C">21</temp-low>
        <weather-data>
            <wind-speed units="kph">6</wind-speed>
            <visibility units="km">2</visibility>
            <weather-code code="rn"/>
        </weather-data>
    </forecast>
    <forecast>
        <date-time>2000-04-05T12:00:00-0500</date-time>
        <temp-high units="C">30</temp-high>
        <temp-low units="C">23</temp-low>
        <weather-data>
            <wind-speed units="kph">4</wind-speed>
            <visibility units="km">1</visibility>
            <weather-code code="rn"/>
        </weather-data>
    </forecast>
    </region-report>
    <weather-desc code="su">Sunny</weather-desc>
    <weather-desc code="pc">Partly Cloudy</weather-desc>
    <weather-desc code="cl">Cloudy</weather-desc>
    <weather-desc code="rn">Rain</weather-desc>
    <weather-desc code="sn">Snow</weather-desc>
</ovxml-weather>
```

The various DTDs, on all levels, prescribe the requisite format of compliant content instances, but not the content itself or its manner of presentation. The topic DTDs and their progeny provide that compliant content includes one, multiple, or all of the following media types: text, short form text, audio, video, graphics images, etc.

FIG. 4B describes an example of a multi-presentation topic DTD 420, which may be representative of the headline news DTD, for example. Compliant content instances must include certain metadata 422 along with one or more of the following elements: full text 424, short-form text 426, audio 428, video 429, and graphics 430. As mentioned above, other media types may be utilized as well, such as "mixed," "file,""tagged text," etc. The "specification" for Onmi-ViewXML (described below) requires that the data fulfilling with elements 422–430 relates to the same underlying piece of information. More particularly, the OmniViewXML specification requires that the short-form text data element 426 is a shortened version of the counterpart full text data element 424, and that the full text data element 426 is a transcription of the audio data element 428. The graphics data element 430 must represent visual information repeating or supporting the other data elements.

TABLE 4, below, lists a single content instance according to the exemplary DTD 420.

TABLE 4

EXEMPLARY CONTENT INSTANCE USING DTD 420

METADATA

Author: Lois Lane
Source: AP Newswire
Title: Medal of Honor
Size: 95 Kb
Creation Date: Feb. 22, 1999

TABLE 4-continued

EXEMPLARY CONTENT INSTANCE USING DTD 420

FULL-TEXT

President Clinton awarded the Medal of Honor on Tuesday to former President Theodore Roosevelt and Civil War Corporal Andrew Jackson Smith, who rescued the flags of his African-American regiment in battle. In a ceremony at the White House Roosevelt room, first used as the office of the former president, Clinton said the medals honored "two people who changed America in more ways than one by their personal courage from very different vantage points. Clinton's award made Roosevelt the first U.S. president to win the Medal of Honor, the nation's highest award for valor in war. Clinton awarded Roosevelt the medal for leading soldiers in his Rough Riders cavalry regiment in a famous charge up San Juan Hill in Cuba on Jul. 1, 1898. The charge, in which Lieutenant Colonel Roosevelt was accompanied by only four or five others, was a pivotal event of the Spanish-American war. By taking San Juan Hill, they eventually forced the enemy fleet into the battle of Santiago Bay, where it was routed. This led to the Spanish surrender and opened the era of America as a global power," Clinton said.

SHORT-FORM TEXT

President Clinton awarded the Medal of Honor on Tuesday to former President Theodore Roosevelt and Civil War Corporal Andrew Jackson Smith, who rescued the flags of his African-American regiment in battle

AUDIO

\\bulk storage\news-story38479.wav

GRAPHICS

\\bulk storage\news-story93709.jpg

Although certain examples such as full text, short form text, audio, and the like are given above as exemplary media types, the metadata DTD may optionally include a section that allows an operator to include further different types of data elements, and in this respect the DTDs are extensible. These extensions may comprise extensions of existing topic DTDs, new topic DTDs, etc.

OmniViewXML Specification

As described here, the various DTDs themselves prescribe the requisite format of data elements such as "image" and "video", etc. Apart from the DTDs, however, the specification describes the intended manner of using OmniViewXML to ensure that all content providers or other content users of OmniViewXML populate OmniViewXML content instances with predictable data content, thereby ensuring that content users can effectively exchange data in this format. Further, as for the requirement that media types in a particular content instance correspond to the same item of information, this may be set forth in the OmniViewXML specification. To implement these concerns, the specification may offer the following potential elements for each content instance, as one example:

1) audio: a computer-readable file containing an item of audible information.
2) full text: a textual transcription of the audio element.
3) short-form text: an abbreviated version of the full text element, of suitable length for presentation by a web enabled phone.
4) video: a computer-readable file containing an item of video information corresponding to the other elements.
5) image: a computer-readable graphics image containing a graphics item whose content corresponds to the other elements of this content instance.
6) file: other miscellaneous binary formats, for future definition by developers. As one anticipated example, a "file" element may include a MICROSOFT EXCEL spreadsheet.

7) mixed: a mix of noncorresponding elements, for example where non-identical audio and text together provide the whole story.

Obtaining Information from Content Providers

To begin illustrating the operation of this invention, FIG. 4A shows a sequence 400 that illustrates operations performed by the system 100 to obtain information from the content providers 108. In subsequent playback sessions (described below), this downloaded information is reformatted and presented to customers in the manner appropriate to their personal interfaces.

For ease of explanation, but without any intended limitation, the example of FIG. 4A is described in the context of the hardware environment of FIG. 1B, as described above. In step 401, the information delivery agency that manages the system 100 (such as INDICAST) makes financial or other suitable arrangements for obtaining information from content providers 108. This may involve subscribing to on-line, wire, satellite, or other information services, for example. According to the present invention, the information delivery agency selects content providers with data that is particularly suitable for the intended playback devices, e.g., audio playback to telephone callers. Thus, the arrangements of step 401 may even involve agreements requiring certain content providers to supply underlying data that is suitable for the intended playback, such as (1) digital audio files in WAV, VOX, AUD, MP3, RA, PCM, or other format or protocol for telephone playback, (2) text stories in suitable brevity, content, detail, and other format for rendering in visual form to web-enabled phones or audio form to any telephone, or (3) other types of data.

The arrangements of step 401 may also specify the type of information to be downloaded from each content provider. As explained in greater detail below, the content processor 160 seeks to repeatedly download information in several predefined areas of subject matter, called "topics." Data under some topics may be downloaded from certain content providers, with data of other topics being downloaded from different content providers.

Step 401 may also include the information delivery agency arranging with one or more content providers for delivery of information in OmniViewXML format. This may be achieved, for example, by agreeing that OmniViewXML will be used, and ensuring that the content provider and information delivery agency utilize the same version of OmniViewXML protocol. The protocol, for instance, may be exchanged with specific content providers or published in an accessible location such as a web site. As one example, content providers may use an OmniViewXML application program interface (API) to place data in OmniViewXML format.

Arrangements having been made, step 402 waits for a "download event" to occur. A download event may occur at the content processor 160 and/or at a content provider 108, and triggers downloading information from a content provider 108 to the content processor 160. Download events may occur periodically, randomly, on a non-periodic schedule, or another basis.

At the content processor 160, for example, a download event may constitute a self-scheduled reminder to start downloading information from one or more content providers particular to that reminder. These reminders may be scheduled periodically (such as every hour, day, etc.), randomly, non-periodically (e.g., whenever a news alert is received), or according to another desired schedule. Downloading may occur more frequently for time critical data (such as stock market updates, traffic reports, etc.) and less often for static or preset data (such as television programming, etc.). Moreover, download events may occur on different schedules for different "topics" (as discussed below), such as continual updates for traffic reports, daily updates for sports scores, and monthly updates for television programming. As one example, one or more content providers 108 may store some or all of their content in a web server, making the content available for fetching by the content processor 160 via the Internet.

Download events may be initiated by the content providers 108 as well, such as when a content provider self-initiates data transfer to the content processor 160 according to its own schedule. Such a schedule may, for example, be periodic, random, non-periodic, or another schedule which might or might not be prearranged with the information delivery agency. As an example, a content provider 108 may experience a download event whenever it accumulates more than a certain amount of information, or whenever a news story breaks.

In step 404, contact is initiated between the content processor 160 and the content provider(s) 108 related to the download event. In the case of a download event at the content processor 160, contact in step 404 is initiated by the content processor 160. For instance, the content processor 160 may initiate contact (step 404) with the content provider 108 in order to request that content provider 108 to start downloading data, engage in handshaking or other tasks related to establishing communications, etc. In the case of a download event at the content provider 108, contact in step 404 is initiated by that content provider 108.

In step 406, the information download occurs. In this operation, the content provider 108 transmits (and the content processor 160 receives) data. In the illustrated example, downloading is performed independent of any individual customer's preferences, and therefore constitutes a "universal" download. If desired, downloading may be driven according to customer preferences in an alternative implementation.

In one example, one or more content providers 108 store some or all of their content in a web of FTP server, making the content available for fetching by the content processor 160 via the Internet. Other means of download including satellite uplink, cable transmission, teletype, etc. Thus, as shown above downloads may be performed on a "push" or "pull" basis.

The content of downloaded data is further explained as follows. Namely, the different pre-set areas of subject matter to be downloaded are referred to as "topics," and the pre-arranged information in these topics is downloaded repeatedly independent of individual customers' preferences (i.e., "universally"). Each download (step 406) may involve one or multiple topics, depending upon the nature of the download event. If content providers have previously placed their content in OnmiViewXML format, the actions of step 406 include downloading content in OmniViewXML format.

With repeated performance of step 406 (FIG. 4A), the content processor 160 maintains a desired level of currency of data in the subject matter of each topic. In the present example, the content processor 160 downloads information in topics of traffic, news, financial ticker, entertainment, sports, weather, and horoscope. An individual item of downloaded data is called a "data element," and may comprise audio, textual transcription of the audio, short-form text, video, graphics, or another media type.

After step 406, the content processor 160 interprets and processes the downloaded content (step 408). As a particular example, an OmniViewXML API or other suitable tool is used to parse OmniViewXML content for separate storage of different media types; alternatively, OmniViewXML content may be stored in the database 152 as-is. As for non-OmniViewXML data, step 408 may involve determining a suitable storage location for the content according to its media type and content, placing the data in OmniViewXML format for storage, or integrating the data into existing OmniViewXML content instances. Non-OmniViewXML data may be placed in OmniViewXML format by a recognition program, or by human interpretation and data entry. As one example, non-OmniViewXML data may include IDs previously arranged between exchanging parties to identify the data as being one of the predefined OmniViewXML media types. After step 408, content processed in step 408 is stored in the database 152 (step 410). Furthermore, at any time, the information delivery agency may resell, lease, share, or otherwise distribute received, aggregated, and/or stored OmniViewXML content to downstream content consumers (step 412).

Account Setup/Change

Figure 5:
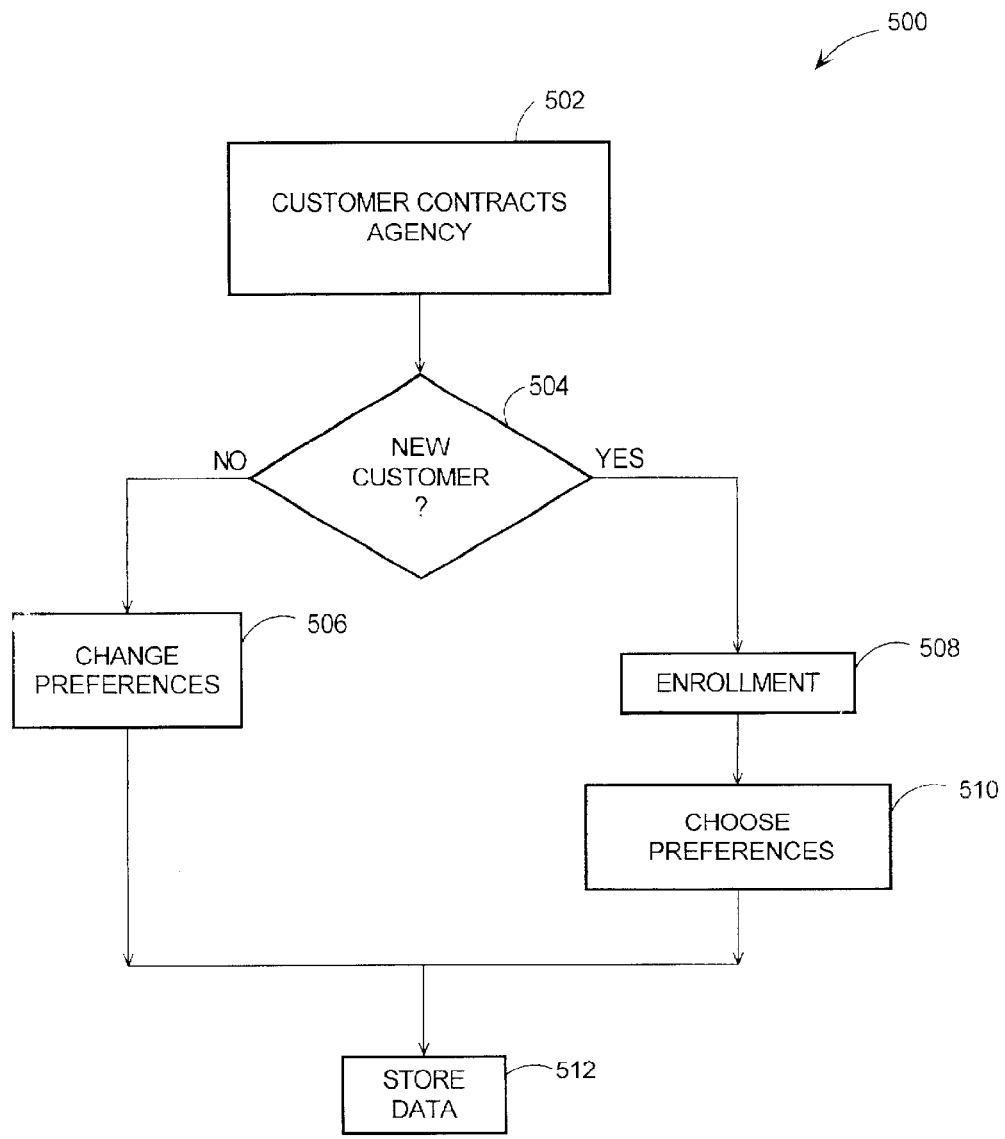
FIG. 5 is a flowchart of an operational sequence for establishing and reconfiguring a customer account according to the invention.

FIG. 5 shows a sequence 500 that illustrates the operations of enrolling and/or reconfiguring a customer account. Completion of customer enrollment is necessary for the customer to subsequently receive customized information from the system 100, as shown below.

For ease of explanation, but without any intended limitation, the example of FIG. 5 is described in the context of the hardware environment of FIG. 1B, as described above. In step 502, a customer contacts the information delivery agency ("agency"). This customer is referred to as the "current" customer. As illustrated in FIG. 1B, contact may be achieved by the customer's use of a personal computer to contact the account server 164. More particularly, the customer's computer utilizes the Internet 102 to interact with the web page presented by the account server 164. Alternatively, the customer 110 may access a telephone or other automated system, or even communicate with human operators of the agency by telephone voice connection, postal service, facsimile, or another appropriate mode of communication. For ease of explanation, the remaining operations are discussed in the context of a completely automated embodiment, where the customer utilizes a personal computer to interact with the account server's web page.

In step 504, the account server 164 consults the customer database 155 to determine whether the current customer is new to the system 100. This may be achieved, for example, by facilitating a log-in process for existing customers and a "set up new account" option for new customers. If the customer is new, the account server 164 proceeds to setup a new account for the current customer in step 508. Step 508 is referred to as "enrollment." After enrollment, the account server 164 prompts, permits, or otherwise enables the customer to construct a list of preferences 183 regarding future delivery of audio information to the customer (step 510). In addition to the content preferences, which specify the type of information for playback, the account server 164 may solicit various playback preferences such playback order, playback language, playback voice type, playback speed, playback volume, etc. Although step 510 (and step 506, discussed below) may be implemented in various ways, the account server 164 may advantageously use a graphics user interface ("GUI") including features such as check-boxes, radio buttons, pull-down menus, and the like.

In contrast to the foregoing description, if step 504 finds that the current customer is not new, step 504 leads to step 506. In step 506, the account server 164 permits the customer to change his/her existing preferences 183, as discussed in greater detail below. Following step 506 (or step 510), step 512 stores the customer's new preferences in the customer database 155, completing the sequence 500.

Customer Preferences

As mentioned above, the routine 500 assists customers in initially establishing and later reconfiguring respective "preferences" that govern future delivery of information. Unlike the universally pre-downloaded "topics" which pertain to predefined areas of subject matter, customers' preferences help the system 100 identify data for presentation to each individual customer during "playback" (as discussed in greater detail in FIGS. 7A–7B, below). As mentioned above, customer preferences include content preferences and playback preferences. The customers' preferences 183 are stored in the customer database 155, mentioned above.

In the subject matter of each topic, the account server 164 is programmed to recognize certain "segments" and various deeper layers of "sub-segments" that are available for inclusion in customers' content preferences. When the account server 164 assists the customer in establishing (step 510) or changing (step 506) the customer's preferences, use of the segments and sub-segments permits customers to carefully tailor their content preferences to their own interests.

An exemplary list of segments under the topic "traffic" may include, for example, all major U.S. cities. Under the segment of a given city, suitable sub-segments may comprise areas of the city, freeways, traffic centers, highway intersections, etc. As another example, the "sports" topic may include segments such as "teams" (with different sports teams providing the sub-segments) and "league summaries" (with different sports providing the sub-segments). In step 510, the customer chooses the topics, segments, and sub-segments of interest to him/her.

To further illustrate the relationship of topics and segments, TABLE 5 (below) shows an exemplary listing of a customer's content preferences.

TABLE 5

EXEMPLARY CUSTOMER PREFERENCE LISTING

Topic 1 - TRAFFIC

| (Segment) | (Sub-Segment) North County |
| San Diego, | (Sub-Segment) South County |
| CA | (Sub-Segment:) East County |
| (Segment) | (Sub-Segment) I.H. 10 |
| Houston, TX | (Sub-Segment) I.H. 35 |
| . . . | . . . |

Topic 2 - HEADLINE NEWS

Wall Street Journal Hourly Report
Headline News
. . .

Topic 3 - FINANCIAL TICKER

ˆDJI, ˆIXIC, ˆSPC, MOT
Topic 4 - ENTERTAINMENT

| Movie Listings | San Diego | La Jolla 3 |
| | | AMC Mission Valley 12 |
| | | Kensington |
| | Santee | Santee Drive-In |
| | Carlsbad | Carlsbad 12 |
| | . . . | . . . |
| Television | San Diego | Channel 1 |

TABLE 5-continued

EXEMPLARY CUSTOMER PREFERENCE LISTING

| Listings | Stations | Channel 2 |
|---|---|---|
|  |  | Channel 3 |
| ... | ... | ... |
| Topic 5 - SPORTS |  |  |
|  |  |  |
| Teams | San Diego Chargers |  |
|  | Chicago Bears |  |
|  | Minnesota Twins |  |
| League | Football |  |
| Summaries | Hockey |  |
|  | W.W.F. |  |
| ... |  |  |
| Topic 6 - WEATHER |  |  |
|  |  |  |
| ... |  |  |
| San Diego |  |  |
| San Francisco |  |  |
| San Jose |  |  |
| ... |  |  |
| Topic 7 - HOROSCOPE |  |  |
|  |  |  |
| Aries |  |  |
| Taurus |  |  |
| Gemini |  |  |
| Cancer |  |  |
| Leo |  |  |
| Virgo |  |  |
| Libra |  |  |
| ... |  |  |

Enrollment

Figure 6:
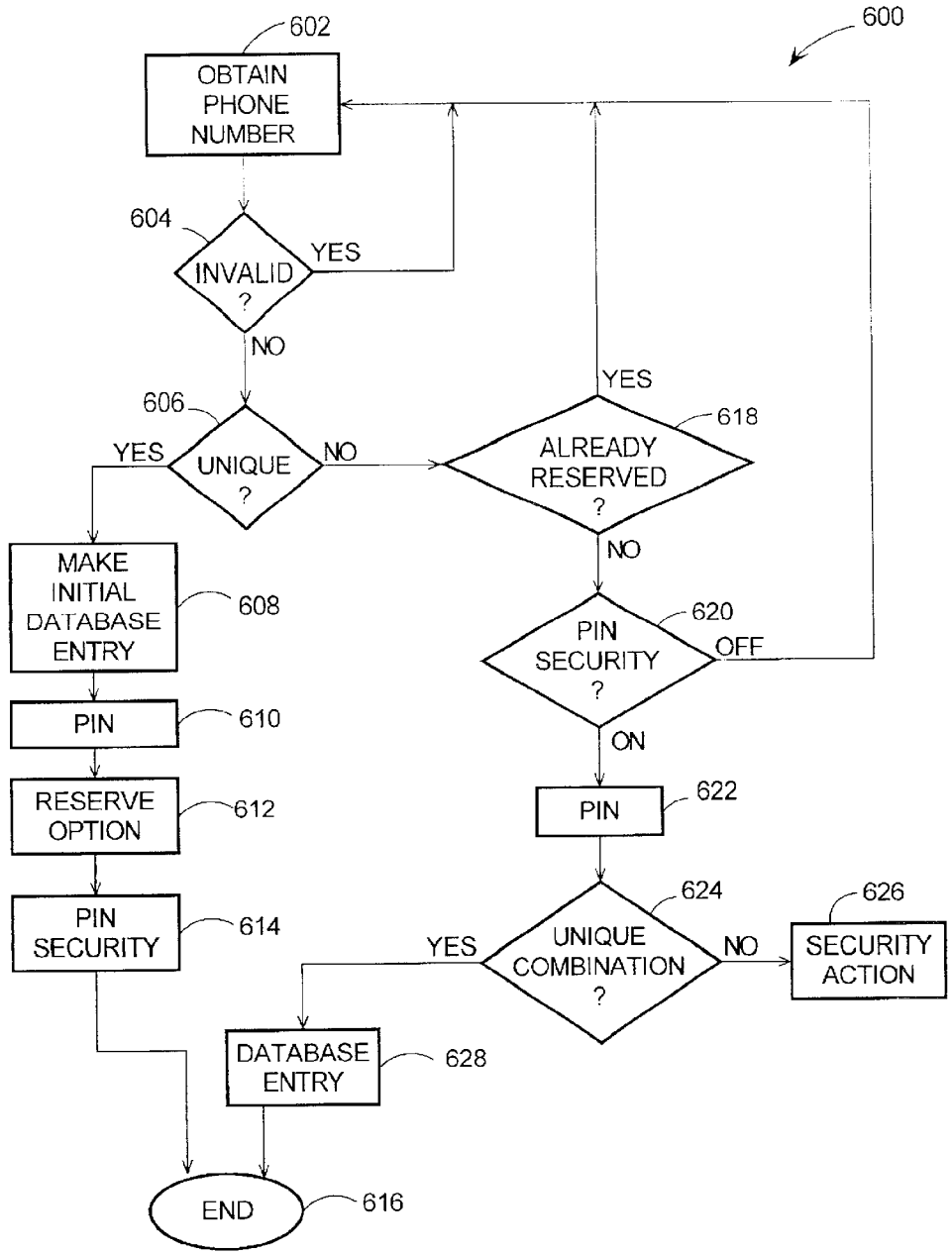
FIG. 6 is a flowchart showing the enrollment routine of the account setup sequence in greater detail, according to the invention.

FIG. 6 shows an operating sequence 600 to describe the enrollment step 508 (FIG. 5) in greater detail. Without any intended limitation, FIG. 6 is described in the context of the hardware components and interconnections of FIG. 1B, and with particular description of intended audio playback. The operations 600, which expand step 508, are performed by the account server 164 as it interacts with a customer 110. For ease of illustration, the following example depicts the embodiment where the account server 164 and customer 110 conduct enrollment by communicating over the public internet 102. In the illustrated embodiment, where the customer 110 is utilizing a computer, interaction between the account server 164 and customer 110 occurs by means of a graphical user interface (GUI) operated by the account server 164.

As the operations 600 involve reading, completing, and updating the log-in profiles 185, an exemplary excerpt of log-in profiles is shown below in TABLE 6. Referring to TABLE 6, the log-in profiles list the following information for each customer:

1. the customer's name.
2. the customer's "designated" phone number (entered by the customer during enrollment, as discussed below).
3. the customer's unique "User-ID".
4. the customer's personal identification number (PIN).
5. whether the customer's designated telephone number is reserved.
6. whether the customer has activated PIN security.
7. whether the designated telephone number is known to be invalid.

TABLE 6

EXEMPLARY LOG-IN PROFILES

| CUS-TOMER NAME | DESIGNATED TELEPHONE NUMBER | USER-ID | PIN | PHONE NUMBER RE-SERVED? | PIN SEC. | IN-VALID PHONE NUM-BER |
|---|---|---|---|---|---|---|
| Husband | 310-555-1212 | 123456 | 1234 | NO | ON | NO |
| Wife | 310-555-1212 | 923457 | 3908 | NO | ON | NO |
| Abbey | 310-555-9999 | 330989 | 1234 | YES | OFF | NO |
| Charley | 310-555-2222 | 220908 | 0090 | NO | OFF | NO |
| Phil | 310-555-7777 | 787790 | 7777 | YES | ON | NO |
| Hacker | 111-222-3333 | — | — | — | — | YES |

The details of TABLE 6 are discussed below, where needed to supplement the operations of FIG. 6.

Referring to FIG. 6, the routine 600 begins in step 602 where the account server 164 prompts the customer to enter a "designated telephone number." As shown below, the customer may enjoy certain advantages in convenience by choosing, as his/her designated telephone number, the number of the telephone that the customer will typically use to receive audio playbacks according to this invention; the account server 164 may so advise the customer in step 602. In step 604, the account server 164 determines whether the designated telephone number is valid, by cross-referencing the number from step 602 with the "invalid phone number" column. For instance, the designated telephone number is invalid if it cites a non-existent area code, corresponds to a stolen telephone, does not contain sufficient digits, etc. Furthermore, human administrators and/or the account server 164 may act in response to hacking attempts, known pranks, and the like by updating the log-in profiles 185 to show an "invalid phone number" entry in association with the intruder's originating telephone number (detected through caller-ID, automated number identification, or other means) and/or the intruder's designated telephone number. As an example, TABLE 6 shows an "invalid" telephone number for "Hacker."

Unless the customer designates a valid telephone number, step 604 returns to step 602. For reasons of security and efficiency, step 604 may (optionally) abort the enrollment process 600 if the enrolling party repeatedly enters invalid telephone numbers. When the customer designates a valid telephone number, step 604 advances to step 606, which reviews the log-in profiles 185 to determine whether any other customer is already using this designated telephone number. If not, this means the designated telephone number is "unique" among the present customers. In TABLE 6, for example, the designated telephone number for Abbey is unique. In this case, step 606 advances to step 608, where the account server 164 makes an initial database entry. Namely, the server 164 generates a User-ID, which is calculated so as to be unique among all customers. New User-IDs may be generated, for example, by adding "one" to the previously assigned User-ID, or another appropriate step. Also in step 608, the server 164 updates the log-in profiles 185 by entering the customer's name (which may be prompted in step 608 or 602 or another step), designated telephone number, and User-ID. Also, the server 164 writes "yes" under the "phone number reserved" column, to temporarily "lock" the designated telephone number during the enrollment process. The use of the "phone number reserved" value is discussed in greater detail below.

After step 608, the server 164 prompts the user for a PIN (step 610), and stores the PIN in the log-in profiles 185. In step 612, the server 164 interacts with the customer to determine whether the customer wishes to "reserve" his/her designated telephone number, and thereby prevent future new customers from using that designated telephone number (as discussed below). If the current customer chooses to reserve his/her designated telephone number, the server 164 leaves the "YES" entry that was placed under "phone number reserved" in step 608 to lock the number during enrollment. Otherwise, the "phone number reserved" column is changed to "NO" for the current customer. In TABLE 6, for example, customer Abbey has chosen to reserve her designated telephone number.

If the customer does not wish to reserve his/her designated telephone number, as with customers Husband or Wife, the server 164 enters "NO" for "phone number reserved" in step 612. After step 612, the server 164 prompts the customer regarding the system's use (or non-use) of PIN security when the customer logs-in to receive future audio playbacks (step 614). Namely, the server 164 advises the customer that s/he may automatically conduct future log-ins by calling the output server 158 (no PIN required). If the customer chooses this option, the server 164 writes "OFF" under the "PIN security" column, as with customers Abbey and Charlie. As step 614 completes the customer's enrollment process, the routine 600 ends in step 616.

Referring back to step 606, if the log-in statistics 185 show that customer's designated telephone number (from step 602) is not unique among all customers in TABLE 6, certain additional steps are performed starting in step 618. An example of this circumstance would be the later one of Husband or Wife to register, since they have the same home telephone number. In general, the server 164 permits multiple customers to use the same designated telephone number to accommodate different users that share the same home or office telephone, for instance. However, as shown above in step 612, the system 164 provides the first customer to utilize a particular designated telephone number with an option to "reserve" that number and thereby prevent future users from using the same designated telephone number. Accordingly, step 618 determines whether the current customer's designated telephone number, found to be non-unique in step 606, is previously reserved. This is performed by consulting the log-in profile 185 to determine whether the "phone number reserved" column contains "YES" or "NO." Although the log-in profiles 185 will show that the number is reserved if the number's initial registrant chose to reserve the number (step 612), the number will also be shown as "reserved" (per step 608) if a previous registrant is currently enrolling under that designated telephone number. If step 618 answers "YES" for either reason, then the number is reserved, and step 618 returns to step 602 to prompt the customer for a different designated telephone number.

On the other hand, if the number is not reserved, then multiple customers can share the number as long as the earlier customer has chosen to have the "PIN security" option placed "ON" (because automated, no-PIN log-ins would not be able to distinguish between two different customers sharing the same designated telephone number). Accordingly, step 620 determines whether the earlier customer's PIN security option is ON or OFF. If PIN security is "OFF," telephone number sharing would breach security for the telephone number's initial registrant, so step 620 returns to step 602, requiring the current customer to submit a different designated telephone number.

If the PIN security option is "ON", this means the designated telephone number's initial registrant requires a PIN to access under that customer's identity. In this case, step 620 advances to step 622, which prompts the enrolling customer to enter a PIN. Step 624 determines whether the current customer's PIN (from step 622) is different than that of the designated telephone number's existing registrant. If so, step 628 updates the log-in profiles 185 to store the newly entered PIN, and the routine ends in step 616. Otherwise, if the customer happened to choose the same PIN as the shared telephone number's initial registrant, then step 624 advances to step 626, which takes one or more appropriate security actions to preserve the security of the designated telephone number's initial registrant. As an example, these actions would be invoked, if customer Wife chooses the PIN 1234, matching customer Husband's pre-existing PIN. Step 626, for example may transmit a notification to the initial registrant advising him/her that another customer has guessed his/her PIN while registering under the shared telephone number. As a different option, step 626 may automatically assign the first registrant a new PIN and transmit notification of that PIN to the registrant, in order to preserve the security of the initial registrant's account. Transmission of such notification may occur by telephone, e-mail, audio, notification when the customer calls to receive a playback, etc. Step 626 also returns the presently enrolling customer to step 622, to obtain another PIN selection. As still another alternative, the account server 164 may assign a PIN (different from the initial registrant's PIN) to the current customer in step 622 and skip steps 624, 626.

Playback Session

Figure 7A:
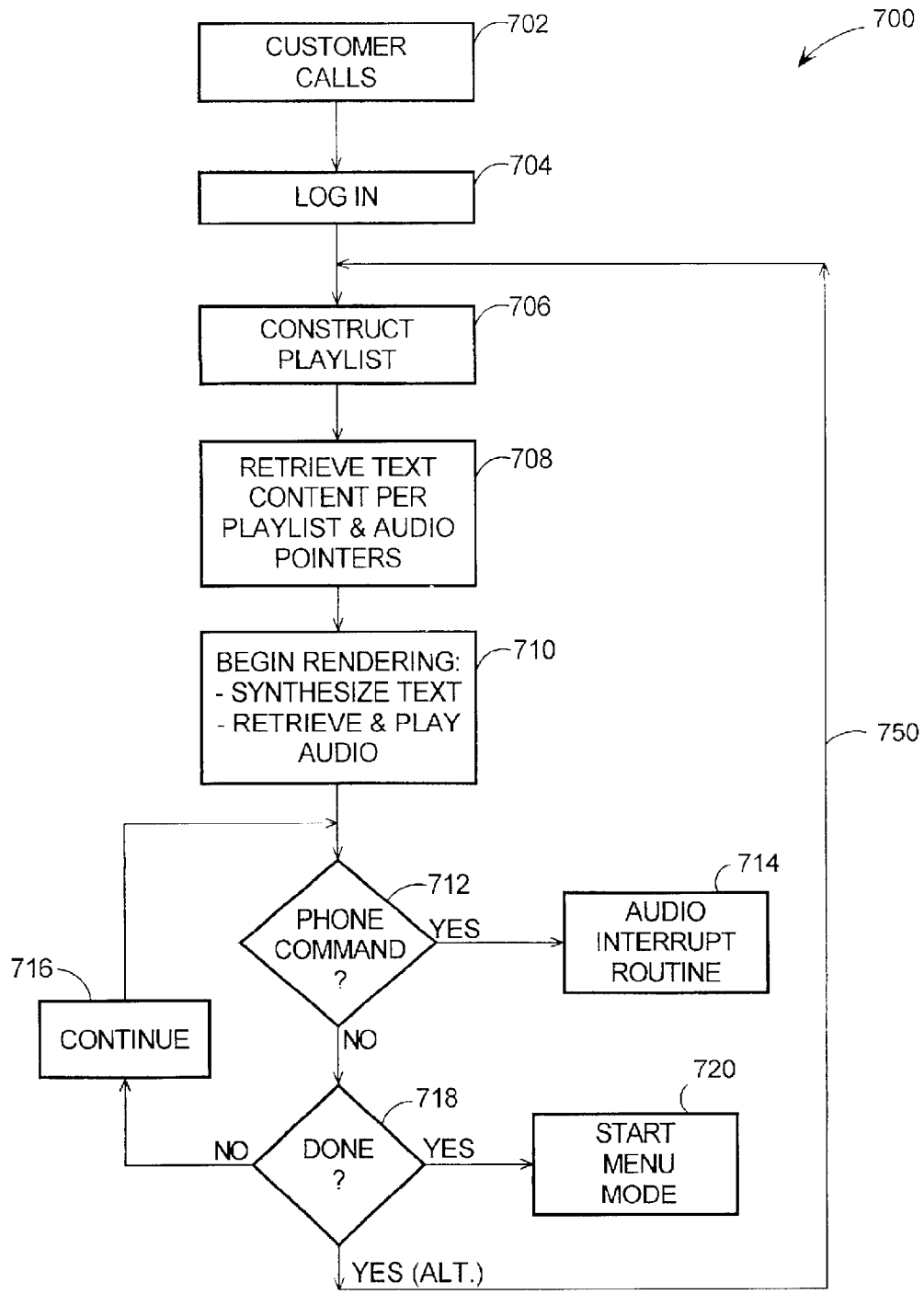
FIG. 7A is a flowchart of an operational sequence for conducting a general purpose playback session according to the invention.

FIG. 7A shows an operational sequence 700 of the session server 156 during a "playback session" initiated by a customer utilizing a telephone. During the playback session, the system 100 retrieves the customer's pre-stored content preferences and proceeds to identify information already present in the universal database that pertains to those particular content preferences. Also, after preparing vocalizations of text information, equipment of the system 100 audibly presents the audio information and vocalizations to the customer in predetermined order via the customer's telephone connection. The order and manner of presentation is dictated by the caller's playback preferences. Playback is achieved by using the intermediate telephone network 106.

More particularly, the playback session is initiated when a customer places a telephone call to the system 100 from a telephone 104 (step 702). Although land line phones may also be used, step 702 may be conveniently initiated by the customer from a wireless telephone while the customer is driving, walking, or otherwise away from a computer. In step 704, the session server 156 conducts a log-in operation, verifying that the caller is an enrolled customer. Broadly, step 704 determines the customer's designated telephone number. and verifies the customer's PIN (if necessary). As shown below, the session server 156 may expedite the log-in process if the number of the customer's telephone 104 appears in the log-in profiles 185, and may further expedite the process if the customer has chosen to set "PIN security" as "OFF" as explained above. As part of step 704, the session server 156 consults the log-in profiles 185 to determine the caller's User-ID. The details of step 704 are illustrated in the sequence 800 (FIG. 8), discussed below.

After log-in completes, the session server 156 constructs the caller's playlist in step 706. Specifically, the session server 156 indexes the preferences 183 by the caller's User-ID to obtain the content preferences particular to the caller. Then, with the caller's content preferences, the session server 156 uses these preferences to retrieve information (step 708) from the universal database 152 in satisfaction of these preferences. In the illustrated example, the session server 156 retrieves (1) text content stored in the universal database 152, and (2) pointers to digital audio files stored in the database 152. The actual pointed-to digital audio files are retrieved later, as discussed below, As an example, if the customer has indicated a desire to hear information in the "sports" topic, the session server 156 accesses the database 152 to retrieve the applicable sports-related file names and locations of those files in the file system. As explained below, the session server builds these files into the playlist and then sends a playlist to the telephony server.

After retrieving the data underlying the caller's playlist (step 708), step 710 starts the process of "rendering" the data, in which audio sounds are transmitted to the customer's telephone 104. Rendering involves (1) processing digital audio files that were identified by the pointers retrieved in step 708 in order to transmit the digitally represented sounds to the customer's telephone 104, and (2) synthesizing text data by using a computer voice synthesizer to pronounce the text.

After the rendering process begins in step 710, additional steps are performed during rendering to assist the caller in "navigating" his/her playlist. Namely, step 712 detects whether the caller has entered a "phone command" using the telephone 104. If step 712 detects a phone command, step 714 performs a audio interrupt routine 714, described below. The audio interrupt routine 714 detects the customer's telephone touchpad entries and/or voice commands and reacts in a preplanned manner to let the caller skip from one topic to the next, repeat a topic, and perform other "navigation" functions.

Otherwise, in the absence of a phone command, step 718 determines whether the rendering step 710 has completed the playlist. If not, rendering continues in step 716. Ultimately, when step 718 determines that the rendering process started in step 710 has completed, step 720 begins a "menu mode" as described below. As an alternative to the menu mode (step 720), step 718 may re-start rendering of the playlist by returning to step 710. Another alternative is to return to step 706 as shown by the path 750, thereby ensuring that the playlist is freshly updated before replaying.

Playback Session—Universal

FIG. 7B shows an operational sequence 750 to illustrate a general purpose playback session, contemplating customers with different types of playback devices 104. As with the sequence 700, the system 100 retrieves the customer's pre-stored content preferences and proceeds to identify information already present in the universal database that pertains to those particular content preferences. Also, after reformatting raw content where needed, equipment of the system 100 renders playback of the information via the customer's personal interface 104, 109, 111. The order and manner of presentation is dictated by the customer's playback preferences. Playback is achieved by using the intermediate telephone network 106, WAP gateway 107, or Internet 102.

More particularly, the playback session is initiated when a customer contacts the system 100 (step 751). This may occur by the customer (1) calling the system 100 from a landline phone or wireless phone such as 104, (2) operating a web browser to access the web site presented by the server 158b, or (3) utilizing a WAP phone 109 to access the server 158c. The input/output server 158 responds to the customer's incoming request by establishing an appropriate connection.

In step 752, the session server 156 conducts a log-in operation as discussed above. After log-in completes, the session server 156 constructs the customer's playlist (step 753). Specifically, the session server 156 indexes the preferences 183 by the customer's User-ID to obtain the content preferences particular to the customer. Then, with the customer's content preferences, the session server 156 uses these preferences to retrieve information (step 754) from the universal database 152 in satisfaction of these preferences. In the illustrated example, the session server 156 retrieves (1) text content, and (2) pointers to audio, video, and other machine-readable code stored in the bulk data 123. The actual pointed-to machine-readable files are retrieved later, as discussed below. The session server 156 builds these files into the playlist and then sends a playlist to the input/output server. Optionally, this may involve placing the relevant content in OmniViewXML format to ease processing by the input/output server 158.

After retrieving the data underlying the customer's playlist (step 754), step 755 starts the process of rendering the data. In the case of telephones, rendering involves:

1. Processing any digital audio files that were identified by the pointers retrieved in step 754 in order to transmit the digitally represented sounds to the customer. This may involve, for example, executing files such as WAV, RA, or other formats of files.
2. Constructing text data into URLs using a computer concatenated speed server to pronounce text.
3. Wrapping the content and voice interface in VoiceXML.
4. Sending the VoiceXML to the voice gateway.

For WAP phones, step 755 involves the input/output server 158 casting the content and WML interface in WML and sending them to the WAP gateway 107. In the case of personal computers, the input/output server 158 re-wraps full text, video, and audio into HTML for personal computer presentation. An understanding of personal computer presentation will be apparent to ordinarily skilled artisans having the benefit of this disclosure.

As with the sequence 700 described above in FIG. 7A, additional steps 757 are performed during rendering to assist the caller in "navigating" his/her playlist. In the case of a phone as playback device, the steps 757 may be implemented by steps 712–720. In the case of a personal computer as playback device, the telephony server 158 casts the content and user interface in HTML and sends them to the server 158 for presentation to the web browsers 111.

Telephone Log-In

FIG. 8 shows the log-in process (from step 704, FIG. 7) in greater detail. As mentioned above, the session server 156 conducts the log-in operation in order to verify that the caller is an enrolled customer, prior to beginning playback. In the case of personal computer log-in, such operations may be conducted by well-known computer log-in procedures which will be apparent to ordinarily skilled artisans, having the benefit of this disclosure.

Accordingly, FIG. 8 is explained in the context of telephone log-in. Broadly, this process determines the customer's designated telephone number, and verifies the customer's PIN (if necessary). Without any intended limitation, FIG. 8 is described in the context of the hardware components and interconnections of FIG. 1B. The operations 800, which expand step 704 (FIG. 7), are performed by the session server 156 as it interacts with a caller 104. In step 802, the session server 156 receives notification of an incoming call, this notice arriving from the telephony server 158. In response, the session server 156 plays a predetermined welcome message such as "Welcome to the Indicast Network!" (step 804).

In step 806, the session server 156 queries the telephony server 158 to determine whether the telephone number of the caller's telephone 104 can be detected, for example by an analog technique such as caller-ID, or by a digital technique such as automatic number identification (ANI). If the number of the caller's telephone 104 can be automatically determined, step 806 advances to step 808, where the session server 156 cross-checks this number with the log-in profiles 185. More specifically, step 808 checks whether the automatically detected number of the telephone 104 matches any of the "designated telephone numbers" in TABLE 6. If so, step 810 advances to step 812, where the session server 156 identifies all User-IDs associated with that designated telephone number in the log-in profiles 185.

If the designated telephone number has multiple associated User-IDs, step 814 proceeds to step 824, where the session server 156 requires the caller to submit a PIN, for example by using voice commands or a telephone keypad. Step 828 then determines whether the submitted PIN is valid, i.e., whether TABLE 6 lists this PIN in association with the designated telephone number that was verified in step 808.

If the PIN is valid, step 828 proceeds to step 818, in which the session server 156 cross-references the PIN in the log-in profiles 185 (TABLE 6) to determine the caller's User-ID. The User-ID enables step 706 (FIG. 7) to determine the caller's preferences and to construct an appropriate playlist, for subsequent use in referencing the user's content preferences and constructing a suitable playlist.

In contrast to the foregoing.description, if the caller-submitted PIN is not valid, step 828 leads to error handling actions in step 830. As an example, step 830 may return to step 824, prompting the caller to submit a different PIN. Furthermore, after experiencing repeated PIN-submission errors, step 830 may disconnect from the telephone 104 to prevent password guessing, hacking, etc. After an excessive number of PIN-submission errors originating from the same telephone number, step 830 may enter the telephone number in the log-in profiles 185 (TABLE 6) as an "invalid phone number." As another option, step 830 may provide forgetful callers with a reminder of their PINs by commencing a hint sequence, or by generating an e-mail message containing the PIN and sending the message to the customer associated with the current designated telephone.

In contrast to the foregoing description, if the designated telephone number only has one associated User-ID (step 814), step 816 proceeds to determine PIN security. If the PIN security option has been selected, step 824 is performed as explained above. If the PIN security option is "OFF" for the caller's designated telephone number (step 816), then step 814 proceeds to step 818 without requiring submission of the caller's PIN. This option may be especially handy for cellular telephone users and other people that wish to call the system 100 and immediately begin listening to the playback of their customized playlist without further action on their part.

The foregoing description addressed the situation where the session server 156 was able to automatically identify the caller's telephone number (step 806). In contrast, if the number of the caller's telephone 104 could not be identified, step 806 proceeds to step 832. In step 832, the session server 156 transmits a synthetic or recorded voice instruction, querying the caller to manually enter his/her telephone number with a suitable entry technique such as touchpad key entry, voice utterance, etc. Then, in step 834, the session server 156 determines whether the telephone number entered by the caller appears in the log-in profiles 185 (i.e., TABLE 6). If not, the session server 156 may treat the caller as a guest (step 836), for example, providing limited services to entice potential customers to enroll. As an alternative, a negative answer to step 834 may cause the server 156 to transmit a refusal message to the customer, and ultimately terminate the call if the customer fails to enter one of the designated telephone numbers listed in the log-in profiles 185.

If step 834 recognizes the telephone number entered by the customer in step 832, then the session server 156 requires the caller to submit a PIN, for example by using voice commands or a telephone keypad (step 838). Alternatively, step 834 may advance to step 812 upon recognizing the telephone number entered by the customer. Step 828 then determines whether the submitted PIN is valid, i.e., whether TABLE 6 lists this PIN in association with the designated telephone number that was entered in step 832. Step 828 leads to steps 830 or 818 as shown above.

Audio Interrupt

Figure 9:
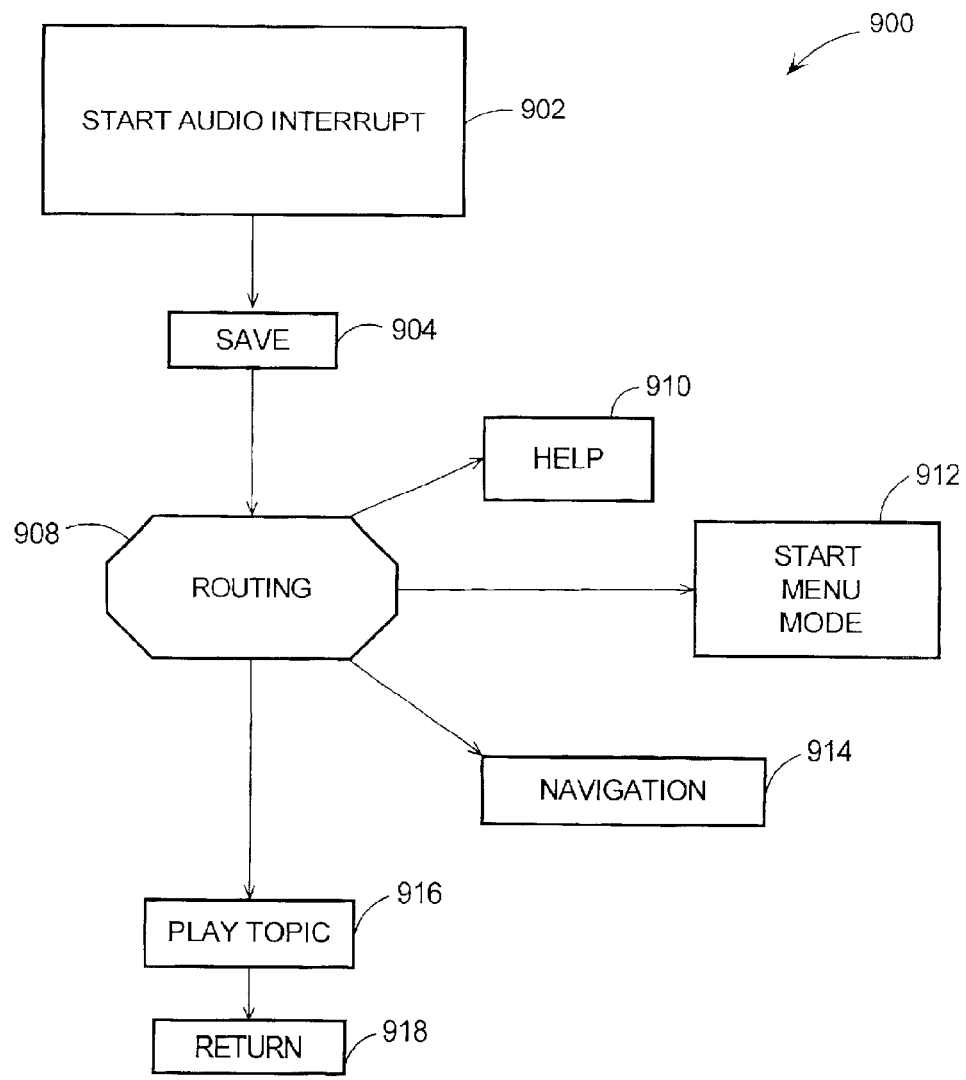
FIG. 9 is a flowchart showing the audio interrupt operational sequence of the telephone playback session in greater detail, according to the invention.

FIG. 9 shows the audio interrupt routine (from step 714, FIG. 7) in greater detail. As mentioned above, the session server 156 performs the audio interrupt routine (step 714) after it detects the caller's entry of a "phone command" during playback (step 712). The audio interrupt routine 714 detects the customer's telephone keypad entries and/or voice commands and reacts in a preplanned manner to let the caller skip from one topic to the next, repeat a topic, and perform other "navigation" functions.

Without any intended limitation, FIG. 9 is described in the context of the hardware components and interconnections of FIG. 1B. The operations 900, which describe step 714 in greater detail, are performed by the session server 156 as it interacts with a caller 104 during the playback sequence 700. The audio interrupt routine starts in step 902, triggered by the caller's entry of a telephone keypad entry or voice-uttered command, which causes an affirmative answer to step 712 (from FIG. 7). In step 904, the session server 156 determines how much of the customer's playlist has been played. Namely, step 904 determines the level of completion of rendering (steps 710, 716 from FIG. 7) at the time the customer's audio interrupt occurred. The session server 156 saves a bookmark, pointer, line number, or other representation of the playback progress when the interrupt occurred (step 904).

Then, in step 908 the session server 156 performs a routing step, which initiates an appropriate subroutine depending upon which key or voice command the caller made (in step 712, FIG. 7) to cause the audio interrupt. As an example, different keypad and/or voice entries may start a help routine (step 910), menu Mode (step 912), navigation routine 914, or play topic routine 916.

With the help routine 910, for instance, the session server 156 may provide a body of explanatory material, divided into different topics presented to the caller in the form of an audio menu, activated by voice command and/or telephone keypad entry. Some help topics may include, for example, instructions about navigation commands and pushbutton equivalents, tips on how to speak to the computer (e.g., naturally and directly into the microphone), instructions on how to change preferences, etc.

Figure 10:
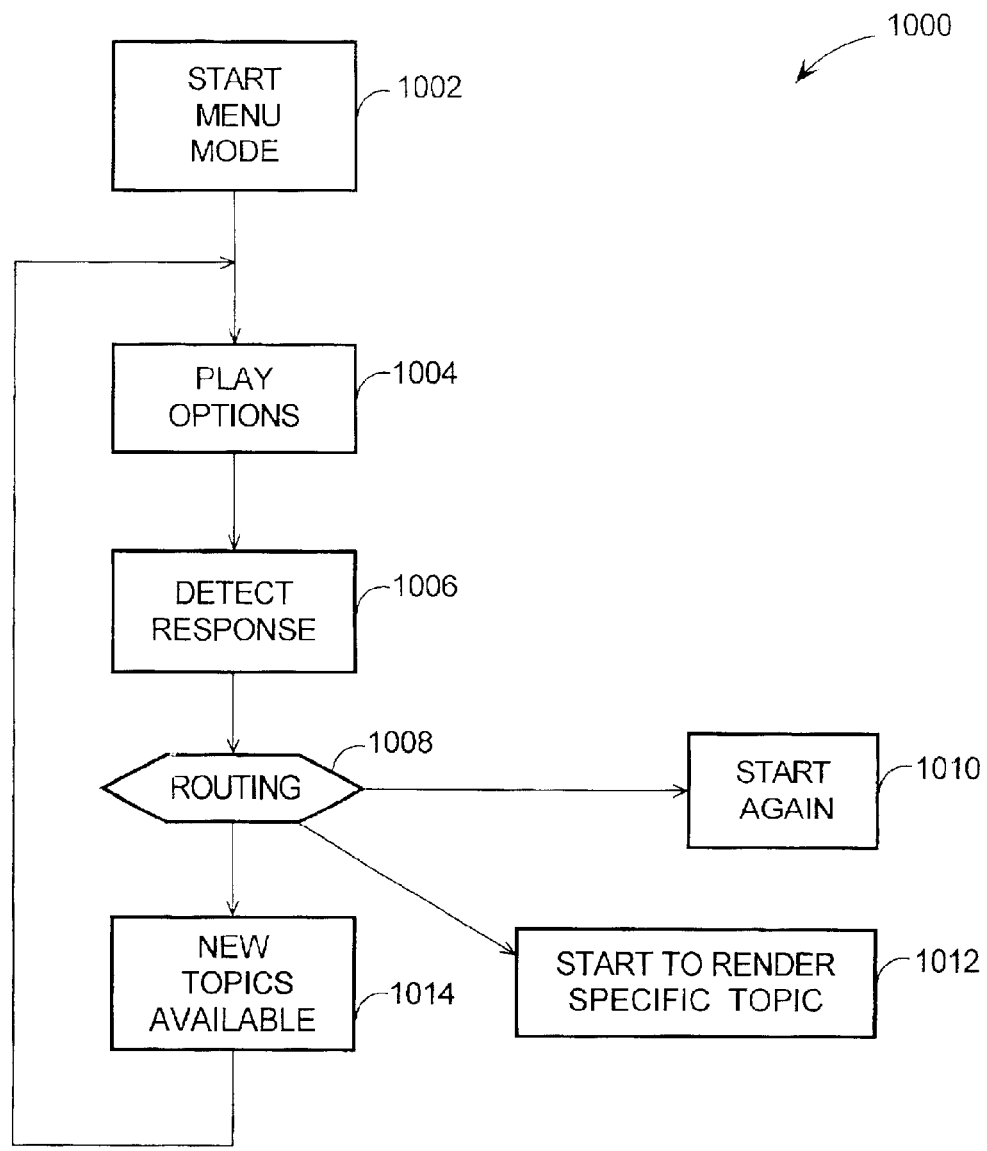
FIG. 10 is a flowchart showing the menu mode of the telephone playback session in greater detail, according to the invention.

The menu mode 912 is discussed in detail below, with reference to the sequence 1000 (FIG. 10). With the navigation routine 914, the session server 156 permits the caller to receive his/her ongoing playback out-of-order. For example, the session server 156 may respond to entry of telephone keypad and/or voice entries as shown below, to permit the caller to navigate his/her playlist as if s/he were listening to songs (i.e., topics, segments, sub-segments . . . ) via audio CD with, the caller's telephone as remote control.

1. "#" key (or any key in the rightmost column of the telephone keypad, or a voice uttered "skip") aborts rendering of the current topic, segment, or sub-segment (depending upon the particular implementation) and skips to the next topic.

2. "0" key, with no other key presses in two seconds (or voice "pause") pauses playback, and pressing the "0" key again with no other key presses in two seconds (or voice "resume") resumes paused rendering.

3. "00" ("0" key pressed twice within two seconds, or voice uttered "speech off") toggles speech recognition on/off, thereby enabling/disabling voice commands. Callers may desire to turn speech recognition off, for example, if they are talking to another person while listening to their playback, or there is conversational background noise that is likely to inadvertently start an "audio interrupt."

4. "*" key (or any key in the leftmost column of the telephone keypad, or voice uttered "backup") causes playback to backup by one segment, if possible.

With the play topic step 916, the session server 156 skips ahead to start playback of a particular topic in response to the caller's utterance of that topic name. As an example, the caller may say "traffic", causing the session server 156 to start rendering the traffic topic. After rendering this topic, the session server 156 returns (step 918) to the routine 700 (FIG. 7) at the point at which the original rendering was interrupted (saved in step 904).

Menu Mode

FIG. 10 provides a more detailed explanation of the menu mode mentioned above in step 720 (FIG. 7) and step 912 (FIG. 9). The session server 156 automatically enters the menu mode after it finishes rendering the caller's playlist (step 718, FIG. 7). In addition, the session server 156 enters the menu mode in response to a particular keypad or voice entry by the caller during playback (step 714, leading to step 912). An exemplary voice utterance to start the menu mode may comprise the word "menu." Whether the menu mode is initiated by steps 718 or 908, the same operational sequence 1000 is initiated, this sequence serving to audibly present various playback options to the caller and respond to the caller's entry accordingly.

Without any intended limitation, FIG. 10 is described in the context of the hardware components and interconnections of FIG. 1B. The operations 1000, which are initiated by step 720 or step 912, are performed by the session server 156 as it interacts with a customer during the playback sequence 700. After the menu mode starts in step 1002, the session server 156 audibly presents the caller with an audio listing of menu options (step 1004). As an example, the menu options may include (1) restarting the caller's playback (step 1010), (2) starting playback of a particular topic (step 1012), or (3) presenting an audible list of newly available topics.

In step 1006, the session server 156 detects the caller's response to the playback options presented in step 1004, this response being entered by the caller's telephone keypad and/or voice command. The caller's response may be entered during or after step 1004 plays the menu options. After detecting the caller's response (step 1006), the session server 156 routes control to an appropriate subroutine in accordance with the caller's selection (step 1008). For instance, in response to the caller's opting to hear the list of new topics, the session server 156 plays a list of the new topics (step 1014). After step 1014, the session server 156 may return to step 1004 to provide the caller with an opportunity to make another menu choice.

If the caller opts to hear a specific topic, the session server 156 begins rendering of that topic in step 1012. After completing that topic, the session server 156 may proceed to the next topic according to the customer's playback preferences, restart the menu mode, etc.

If the session server 156 detects that the caller did not make any response (step 1006) after entering the menu mode, the session server 156 may restart rendering (step 1010), for example by returning to step 710, FIG. 7. Alternatively, if the menu mode had been entered by audio interrupt (FIG. 9), step 1010 may return to the point in the caller's playback where the interruptions occurred and resume playback.

Other Embodiments

While the foregoing disclosure shows a number of illustrative embodiments of the invention, it will be apparent to those skilled in the art that various changes and modifications can be made herein without departing from the scope of the invention as defined by the appended claims. Furthermore although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

APPENDIX A

```
COPYRIGHT (C) 2000, 2001 INDICAST CORPORATION; ALL RIGHTS RESERVED
Purpose: Define the form of OmniViewXML metadata.
Dependencies: None.
<!-- ............................................................ -->
<!-- Element and attribute data typing                             -->
<!-- ............................................................ -->
<!ENTITY % omt:text-type '#PCDATA'>
<!ENTITY % omt:text-type.att      'e-dtype         NMTOKEN     #FIXED "string"' >
<!ENTITY % omt:uri-type           '#PCDATA'>
<!ENTITY % omt:uri-type.att       'e-dtype         NMTOKEN     #FIXED "uri"' >
<!ENTITY % omt:date-type          '#PCDATA'>
<!ENTITY % omt:date-type.att      'e-dtype         NMTOKEN     #FIXED "date"
                                   e-standard      CDATA       #FIXED "ISO 8601"
                                   e-format        CDATA       # F I X E D
"YYYY-MM-DDThh:mm:ss(Z|((+|−)hh:mm))"' >
<!ENTITY % omt:classification-type
                                  '#PCDATA'>
<!ENTITY % omt:classification-type.att
                                  'e-dtype         NMTOKEN     #FIXED "string"' >
<!ENTITY % omt:ident-type         '#PCDATA'>
```

APPENDIX A-continued

```
<!ENTITY % omt:ident-type.att        'e-dtype         NMTOKEN       #FIXED "decimal"' >
<!ENTITY % omt:decimal-type          '#PCDATA'>
<!ENTITY % omt:decimal-type.att
                                     'e-dtype         NMTOKEN       #FIXED "decimal"' >
<!ENTITY % omt:name-type             '#PCDATA'>
<!ENTITY % omt:name-type.att
                                     'e-dtype         NMTOKEN       #FIXED "string"' >
<!ENTITY % omt:entities-type         '#PCDATA'>
<!ENTITY % omt:entities-type.att
                                     'e-dtype         NMTOKEN       #FIXED "ENTITIES"'
>
<!-- ............................................... -->
<!-- Common attributes                                -->
<!-- ............................................... -->
<!--    code attribute:
        A machine-readable code as an alternate representation for
        the element's value -->
<!ENTITY % omt:code.att              'code            CDATA         #IMPLIED' >
<!ENTITY % omt:uri.att               'uri             CDATA         #IMPLIED' >
<!ENTITY % omt:lang.att              'xml:lang        NMTOKEN       "en-US"' >
<!ENTITY % omt:relevance.att         'relevance       ( direct
                                                      | local
                                                      | state
                                                      | country
                                                      | world
                                                      )              #FIXED "direct"' >
<!ENTITY % omt:name.att              'name            NMTOKEN       #IMPLIED' >
<!-- The attributes minOccurs and maxOccurs use a different naming convention
        to match that of XML Schema -->
<!ENTITY % omt:minOccurs.att         'minOccurs       CDATA         #IMPLIED' >
<!ENTITY % omt:maxOccurs.att         'maxOccurs       CDATA         #IMPLIED' >
<!ENTITY % omt:type.att              'type            ( string
                                                      | boolean
                                                      | float
                                                      | double
                                                      | decimal
                                                      | timeInstant
                                                      | timeDuration
                                                      | recurringInstant
                                                      | binary
                                                      | uri
                                                      | language
                                                      | NMTOKEN
                                                      | NMTOKENS
                                                      | Name
                                                      | Qname
                                                      | NCNAME
                                                      | ID
                                                      | IDREF
                                                      | IDREFS
                                                      | ENTITY
                                                      | ENTITIES
                                                      | NOTATION
                                                      | integer
                                                      | non-negative-integer
                                                      | positive-integer
                                                      | non-positive-integer
                                                      | negative-integer
                                                      | date
                                                      | time
                                                      )              #IMPLIED' >
<!ENTITY % omt:src.att               'src             CDATA         #IMPLIED' >
<!ENTITY % omt:size-bytes.att
                                     'size-bytes   CDATA            #IMPLIED' >
<!-- TODO: Add more -->
<!ENTITY % omt:platform.att          'platform        ( voxml
                                                      | voicexml
                                                      | wap
                                                      | html
                                                      | all
                                                      )              "all"' >
<!ENTITY % omt:duration.att          'duration        CDATA         #IMPLIED' >
<!ENTITY % omt:sample-rate-hz.att
                                     'sample-rate-hz  CDATA         #IMPLIED' >
<!ENTITY % omt:sample-size-bits.att
                                     'sample-size-bits CDATA        #IMPLIED' >
<!ENTITY % omt:channels.att          'channels        ( stereo
                                                      | mono
                                                      | quadraphonic
```

APPENDIX A-continued

```
                                                        )              "mono'" >
<!ENTITY % omt:encoding.att       'encoding            CDATA          #IMPLIED' >
<!ENTITY % omt:height.att 'height  CDATA               #IMPLIED' >
<!ENTITY % omt:width.att 'width    CDATA               #IMPLIED' >
<!ENTITY % omt:align.att 'align    ( texttop
                                   | top
                                   | middle
                                   | absmiddle
                                   | bottom
                                   | absbottom
                                   )              #IMPLIED' >
<!ENTITY % omt:hor_resolution.att  'hor_resolution      CDATA          #IMPLIED' >
<!ENTITY % omt:ver_resolution.att  'ver_resolution      CDATA          #IMPLIED' >
<!ENTITY % omt:mimetype.att        'mimetype            CDATA          #IMPLIED' >
<!ENTITY % omt:embedded-formatting.att   'embedded-formatting
                                   (yes
                                   | no
                                   )         "no'">
<!ENTITY % omt:geography.att       'geography           CDATA          #IMPLIED' >
<!ENTITY % omt:expiration.att      'expiration          CDATA          #IMPLIED' >
<!ENTITY % omt:resale.att 'resale  ( yes
                                   | no
                                   )         "yes'">
<!ENTITY % omt:latitude.att        'latitude            NMTOKEN        #IMPLIED' >
<!ENTITY % omt:longitude.att       'longitude           NMTOKEN        #IMPLIED' >
<!-- ............................................. -->
<!-- Common element lists                            -->
<!-- ............................................. -->
<!ENTITY % omt:address.list        '( omt:street?
                                   , omt:city?
                                   , omt:county-or-region?
                                   , omt:state-or-province?
                                   , omt:postal-code?
                                   , omt:country?
                                   )' >
<!ENTITY % omt:region-location.list  '( omt:city?
                                   , omt:county-or-region?
                                   , omt:state-or-province?
                                   , omt:postal-code?
                                   , omt:country?
                                   )' >
<!ENTITY % omt:contact-info.list
                                   '( omt:contact-name?
                                   , omt:contact-uri?
                                   , omt:organization?
                                   , %omt:address.list;?
                                   , omt:home-phone?
                                   , omt:work-phone?
                                   , omt:home-email?
                                   , omt:work-email?
                                   , omt:url?
                                   )' >
<!ENTITY % omt:phone.list          '( omt:country-code?
                                   , omt:area-code?
                                   , omt:number?
                                   )' >
<!ENTITY % omt:media.list          'omt:audio*
                                   , omt:video*
                                   , omt:img*
                                   , omt:full-text*
                                   , omt:short-text*
                                   , omt:file*
                                   , omt:mixed*
                                   ' >
<!-- ............................................. -->
<!-- Root metadata element                           -->
<!-- ............................................. -->
<!--   resource: Set of high-level resources reflecting portions of the
       Dublin Core -->
<!ELEMENT omt:ovxml-resource       ( omt:title?
                                   , omt:creator*
                                   , omt:subject*
                                   , omt:description?
                                   , omt:publisher?
                                   , omt:distributor?
                                   , omt:contributor*
                                   , omt:date-time?
                                   , omt:release?
                                   , omt:expire?
```

APPENDIX A-continued

```
                                    , omt:classification?
                                    , omt:format?
                                    , omt:source*
                                    , omt:identifier?
                                    , omt:revision?
                                    , omt:series?
                                    , omt:language?
                                    , omt:relation*
                                    , omt:location?
                                    , omt:rights?
                                    , omt:raw-schema?
                                    , omt:stylesheet*
                                    ) >
<!ATTLIST omt:ovxml-resource        xmlns:omt      CDATA          #FIXED
                                    "file:///data/indicast/website/dtds/ovxml-resource.dtd" >
<!-- ............................................................ -->
<!-- Major elements grouped by Dublin Core categories    -->
<!-- ............................................................ -->
<!-- DC:Title -->
<!ELEMENT omt:title                 (%omt:text-type;) >
<!ATTLIST omt:title         %omt:text-type.att; >
<!-- DC:Creator -->
<!ELEMENT omt:creator               (%omt:contact-info.list;) >
<!-- DC:Subject -->
<!ELEMENT omt:subject               (%omt:text-type;) >
<!ATTLIST omt:subject       %omt:text-type.att; >
<!-- DC:Description -->
<!ELEMENT omt:description           ( %omt:text-type;
                                    | omt:org
                                    | omt:event
                                    | omt:person
                                    | omt:keyword
                                    )* >
<!ATTLIST omt:description %omt:text-type.att; >       <!- TODO: Is this data type correct?
-->
<!ELEMENT omt:org                   (%omt:name-type;) >
<!ATTLIST omt:org                   %omt:name-type.att;
                                    %omt:code.att; >
<!ELEMENT omt:event                 (%omt:name-type;) >
<!ATTLIST omt:event                 %omt:name-type.att;
                            %omt:code.att; >
<!ELEMENT omt:person                (%omt:name-type;) >
<!ATTLIST omt:person                %omt:name-type.att;
                                    %omt:code.att; >
<!ELEMENT omt:keyword               (%omt:name-type;) >
<!ATTLIST omt:keyword               %omt:name-type.att;
                            %omt:code.att; >
<!ELEMENT omt:more-info             (%omt:uri-type;) >
<!ATTLIST omt:more-info             %omt:uri-type.att; >
<!-- DC:Publisher -->
<!ELEMENT omt:publisher             (%omt:contact-info.list;) >
<!ELEMENT omt:distributor           (%omt:contact-info.list;) >
<!-- DC:Contributor -->
<!ELEMENT omt:contributor           (%omt:contact-info.list;) >
<!-- DC:Date -->
<!ELEMENT omt:date-time             (%omt:date-type;) >
<!ATTLIST omt:date-time             %omt:date-type.att; >
<!ELEMENT omt:release               (%omt:date-type;) >
<!ATTLIST omt:release               %omt:date-type.att; >
<!ELEMENT omt:expire                (%omt:date-type;) >
<!ATTLIST omt:expire                %omt:date-type.att; >
<!-- DC:Type -->
<!ELEMENT omt:classification        (%omt:classification-type;) >
<!ATTLIST omt:classification        %omt:classification-type.att; >
<!-- DC:Format -->
<!ELEMENT omt:format                ( omt:audio?
                                    , omt:video?
                                    , omt:img?
                                    , omt:full-text?
                                    , omt:short-text?
                                    , omt:file?
                                    ) >
<!ELEMENT omt:audio                 (omt:ovxml-resource?) >
<!ATTLIST omt:audio                 a-dtype    NMTOKENS
                                    #FIXED "string uri decimal timeDuration decimal decimal string
string"
                                    %omt:mimetype.att;
                                    %omt:src.att;
                                    %omt:size-bytes.att;
```

APPENDIX A-continued

```
                         %omt:duration.att;
                         %omt:sample-rate-hz.att;
                         %omtsample-size-bits.att;
                         %omt:channels.att;
                         %omt:encoding.att; >
<!ELEMENT omt:video      (omt:ovxml-resource?) >
<!ATTLIST omt:video      a-dtype     NMTOKENS #FIXED "string uri decimal
timeDuration string decimal decimal"
                         %omt:mimetype.att;
                         %omt:src.att;
                         %omt:size-bytes.att;
                         %omt:duration.att;
                         %omt:encoding.att;
                         %omt:hor_resolution.att;
                         %omt:ver_resolution.att; >
<!ELEMENT omt:img        (omt:ovxml-resource?) >
<!ATTLIST omt:img a-dtype NMTOKENS #FIXED "string uri decimal decimal decimal
string"
                         %omt:mimetype.att;
                         %omt:src.att;
                         %omt:size-bytes.att;
                         %omt:height.att;
                         %omt:width.att;
                         %omt:align.att; >
<!ELEMENT omt:full-text  ( %omt:text-type; | omt:ovxml-resource )* >
<!ATTLIST omt:full-text  a-dtype     NMTOKENS #FIXED "uri string string"
                         %omt:mimetype.att;
                         %omt:src.att;
                         %omt:size-bytes.att;
                         %omt:embedded-formatting.att; >
<!ELEMENT omt:short-text ( %omt:text-type; | omt:ovxml-resource )* >
<!ATTLIST omt:short-text a-dtype     NMTOKENS #FIXED "uri string string"
                         %omt:mimetype.att;
                         %omt:src.att;
                         %omt:size-bytes.att;
                         %omt:embedded-formatting.att; >
<!ELEMENT omt:file       (omt:ovxml-resource?) >
<!ATTLIST omt:file       a-dtype     NMTOKENS #FIXED "string uri decimal"
                         %omt:mimetype.att;
                         %omt:src.att;
                         %omt:size-bytes.att; >
<!ELEMENT omt:mixed      ( %omt:text-type;
                         | omt:audio
                         | omt:video
                         | omt:img
                         | omt:full-text
                         | omt:short-text
                         | omt:file )* >
<!-- DC:Identifier and DC:Source -->
<!ELEMENT omt:source     EMPTY >
<!ATTLIST omt:source     a-dtype     NMTOKEN #FIXED "uri"
                         %omt:uri.att; >
<!ELEMENT omt:identifier (%omt:name-type;) >
<!ATTLIST omt:identifier %omt: name-type.att; >
<!ELEMENT omt:revision   (%omt:decimal-type;) >
<!ATTLIST omt:revision   %omt:decimal-type.att; >
<!ELEMENT omt:series     EMPTY >
<!ATTLIST omt:series     a-dtype     NMTOKENS #FIXED "decimal decimal"
                         number      CDATA       "1"
                         of          CDATA       "1" >
<!-- DC:Language -->
<!ELEMENT omt:language   EMPTY >
<!ATTLIST omt:language   %omt:lang.att; >
<!- DC:Relation -->
<!ELEMENT omt:relation   EMPTY >
<!ATTLIST omt:relation   a-dtype     NMTOKEN #FIXED "uri"
                         %omt:uri.att; >
<!- DC:Coverage ->
<!ELEMENT omt:location   (%omt:address.list;) >
<!ATTLIST omt:location   a-dtype     NMTOKENS #FIXED "string uri decimal
decimal"
                         %omt:relevance.att;
                         %omt:uri.att;
                         %omt:latitude.att;
                         %omt:longitude.att; >
<!-- DC:Rights -->
<!ELEMENT omt:rights     ( omt:copyright*
                         , omt:distribution?
                         , omt:distribution-limits*
```

APPENDIX A-continued

```
                         , omt:archival?
                         , omt:syndication?
                         ) >
<!ELEMENT omt:copyright           (%omt:name-type;) >
<!ATTLIST omt:copyright           %omt: name-type.att; >
<!ELEMENT omt:distribution        (%omt:text-type;) >
<!ATTLIST omt:distribution%omt:text-type.att; >
<!ELEMENT omt:distribution-limits
                                  EMPTY >
<!ATTLIST omt:distribution-limits
                                  a-dtype         NMTOKENS #FIXED "string string"
                                  %omt:platform.att;
                                  %omt:geography.att; >
<!ELEMENT omt:archival            EMPTY >
<!ATTLIST omt:archival            a-dtype         NMTOKEN #FIXED "timeDuration"
                        %omt:expiration.att; >
<!ELEMENT omt:syndication         EMPTY >
<!ATTLIST omt:syndication         a-dtype         NMTOKEN #FIXED "string"
                        %omt:resale.att; >
<!-- ............................................... -->
<!-- Additional Metadata Elements                     -->
<!-- ............................................... -->
<!-- raw-schema:   Used to define "raw" (unformatted) data XML for a
                   new content type. It is a subset of XML Schema -->
<!ELEMENT omt:raw-schema          (omt:element*) >
<!ELEMENT omt:element             (omt:type*) >
<!ATTLIST omt:element             a-dtype         NMTOKENS #FIXED"string string decimal
decimal"
                                  %omt:name.att;
                                  %omt:type.att;
                                  %omt:minOccurs.att;
                                  %omt:maxOccurs.att; >
<!ELEMENT omt:type                (omt:attribute*) >
<!ELEMENT omt:attribute           EMPTY >
<!ATTLIST omt:attribute           a-dtype         NMTOKENS #FIXED "string string"
                                  %omt:name.att;
                                  %omt:type.att; >
<!-- stylesheet:  Used to specify one or more URIs of style sheets.
                  The user will choose one by selecting the name -->
<!ELEMENT omt:stylesheet          EMPTY >
<!ATTLIST omt:stylesheet    a-dtype     NMTOKENS #FIXED "string string uri"
                                  %omt:name att;
                                  %omt:platform.att;
                                  %omt:uri.att; >
<!-- Elements under contact-info.list (directly or indirectly) -->
<!ELEMENT omt:contact-name        (%omt:name-type;) >
<!ATTLIST omt:contact-name        %omt:name-type.att; >
<!ELEMENT omt:contact-uri         (%omt:uri-type;) >
<!ATTLIST omt:contact-uri %omt:uri-type.att; >
<!ELEMENT omt:organization        (%omt:name-type;) >
<!ATTLIST omt:organization        %omt:name-type.att; >
<!ELEMENT omt:telephone                  (%omt:phone.list;) >
<!ATTLIST omt:telephone           phone-type CDATA #IMPLIED >
<!ELEMENT omt:home-phone          (%omt:phone.list;) >
<!ELEMENT omt:work-phone          (%omt:phone.list;) >
<!ELEMENT omt:work-email          (%omt:uri-type;) >
<!ATTLIST omt:work-email%omt:uri-type.att; >
<!ELEMENT omt:home-email          (%omt:uri-type;) >
<!ATTLIST omt:home-email          %omt:uri-type.att; >
<!ELEMENT omt:url          (%omt:uri-type;) >
<!ATTLIST omt:url          %omt:uri-type.att;
<!ELEMENT omt:city                (%omt:name-type;) >
<!ATTLIST omt:city         %omt:name-type.att;
                        %omt:code.att;
<!ELEMENT omt:street              (%omt:name-type;) >
<!ATTLIST omt:street              %omt:name-type.att; >
<!ELEMENT omt:state-or-province          (%omt:name-type;) >
<!ATTLIST omt:state-or-province          %omt:name-type.att;
                                  %omt:code.att; >
<!ELEMENT omt:county-or-region           (%omt:name-type;) >
<!ATTLIST omt:county-or-region           %omt:name-type.att;
                                  %omt:code.att; >
<!ELEMENT omt:postal-code         (%omt:name-type;) >
<!ATTLIST omt:postal-code         %omt:name-type.att; >
<!ELEMENT omt:country             (%omt:name-type;) >
<!ATTLIST omt:country             %omt:name-type.att;
                        a-dtype    NMTOKEN #FIXED "string"
                        a-standard CDATA #FIXED "ISO 3166"
                        %omt:code.att; >
```

APPENDIX A-continued

```
<!ELEMENT omt:country-code    (%omt:name-type;) >
<!ATTLIST omt:country-code    %omt: name-type.att;
                              a-dtype    NMTOKEN #FIXED "string"
                              a-standard CDATA #FIXED "ISO 3166"
                              %omt:code.att; >
<!ELEMENT omt:area-code       (%omt:name-type;) >
<!ATTLIST omt:area-code       %omt:name-type.att; >
<!ELEMENT omt:number          (%omt:name-type;) >
<!ATTLIST omt:number          %omt:name-type.att; >
<!-- ......................................................... -->
<!-- Other Metadata not under the ovxml-resource element. -->
<!-- ......................................................... -->
<!ELEMENT omt:region-location  (%omt:region-location.list;) >
<!ATTLIST omt:region-location  a-dtype    NMTOKENS #FIXED "string uri"
                               %omt:relevance.att;
                               %omt:uri.att; >
<!-- ......................................................... -->
<!-- End of OmniViewXML Metadata DTD                -->
<!-- ......................................................... -->
```

What is claimed is:

1. A method for managing data, comprising operations of:
providing a multiple-view format for representing information content, comprising:
a first guideline that instances of said format include one or more data elements, where each data element has one of multiple predetermined media types;
a second guideline that all data elements of an instance of the format represent the same content;
a third guideline that data elements of each instance of the format occur in presentation independent form;
receiving one or more items of information, and preparing an instance of the format comprising a computer-readable representation of the information.

2. The method of claim 1, the predetermined media types including multiple of the following: text, short-form text, audio, video, image, tagged text, mixed, file.

3. The method of claim 1, the preparing operation being performed by a computer, the operations further comprising a transmitting the instance to another computer.

4. The method of claim 1, the operations further comprising storing the instance in nonvolatile storage.

5. The method of claim 1, the operation of providing the multiple-view format comprising providing an application of eXtensible Markup Language.

6. The method of claim 1, the media types including at least text and audio, the first guideline prescribing that within an instance any text element provides a transcription of any audio element.

7. The method of claim 1, the operation of providing the multiple-view format comprising
providing a specification and one or more Data Type Definitions (DTDs).

8. The method of claim 1, where the first guideline prescribes that data elements of one or more media types may comprise pointers to storage locations containing machine-readable files.

9. A method of exchanging data between parties, comprising:
first and second parties agreeing upon use of a multiple-view format for representing
information content, the format comprising:
a first guideline that instances of said format include one or more data elements, where each data element has one of multiple predetermined media types;
a second guideline that all data elements of an instance of the format represent the same content;
a third guideline that data elements of each instance of the format occur in presentation independent form;
in the first and second parties exchanging data comprising one or more instances of the format.

10. A signal-bearing medium tangibly embodying a machine-readable data object observing a multiple-view format for representing information content, the format comprising:
a first guideline that instances of said format include multiple data elements, where each data element has one of multiple predetermined media types;
a second guideline that all data elements of an instance of the format represent the same content;
a third guideline that data elements of each instance of the format occur in presentation independent form.

11. The medium of claim 10, the media types including at least text and audio, the first guideline prescribing that within an instance a text element provides a transcription of the audio element.

12. The medium of claim 10, where the first guideline prescribes that data elements of one or more media types may comprise pointers to storage locations containing machine-readable files.

13. A machine-readable data object product prepared by a process comprising:
providing a multiple-view format for representing information content, comprising:
a first guideline that instances of said format include one or more data elements, where each data element has one of multiple predetermined media types;
a second guideline that all data elements of an instance of the format represent the same content;
a third guideline that data elements of each instance of the format occur in presentation independent form;
receiving one or more items of information, and preparing an instance of the format comprising a computer-readable representation of the information.

14. The product of claim 13, the predetermined media types including multiple of the following: text, short-form text, audio, video, image, tagged text, mixed, file.

15. The product of claim 13, preparing operation being performed by a computer, the process of preparing the product further including operations comprising transmitting the instance to another computer.

16. The product of claim 13, the process of preparing the product further comprising storing the instance in nonvolatile storage.

17. The product of claim 13, the process of preparing the product being performed such that the operation of providing the multiple-view format provides an application of eXtensible Markup Language.

18. The product of claim 13, the media types including at least text and audio the first guideline prescribing that within an instance any text element provides a transcription of any audio element.

19. The product of claim 13, the operation of providing the multiple-view format comprising providing a specification and one or more Data Type Definitions (DTDs).

20. The product of claim 13, where the first guideline prescribes that data elements of one or more media types may comprise pointers to storage locations containing machine-readable files.

21. A method for delivering multimedia information to requestors, comprising operations of:
   assembling a universal database by gathering content instances each including one or more data elements in predefined topics, where data elements of a content instance provide alternative representations of the same item of information in different media types;
   storing the data elements in a database, the database associating each item of information with all data elements representing that story item of information;
   receiving connection requests from requesters via personal interfaces including at least one of the following: telephone, web-enabled phone, Internet web browser;
   responsive to each connection request, establishing a connection with the personal interface and during the connection performing operations comprising:
      retrieving pre-stored preferences specific to the caller, said preferences including content preferences;
      identifying content instances in the universal database that pertain to the identified requestor's pre-stored content preferences and identifying data elements of the identified content instance having media types compatible with the requestor's personal interface; and
      rendering the identified information to the requestor's personal interface in suitable format for playback to the requestor's personal interface.

22. The method of claim 21, where the operation of assembling the universal database further comprises:
   receiving information content provided in a multiple-view format that comprises a first guideline that instances of said format include one or more data elements, where each data element has one of multiple predetermined media types; a second guideline that all data elements of an instance of the format represent the same content; a third guideline that data elements of each instance of the format occur in presentation independent form.

23. The method of claim 21, where the operation of storing the data elements in the database comprises:
   organizing the data elements in a multiple-view format that comprises:
      a first guideline that instances of said format include one or more data elements, where each data element has one of multiple predetermined media types;
      a second guideline that all data elements of an instance of the format represent the same content;
      a third guideline that data elements of each instance of the format occur in presentation independent form;
   storing the organized data elements in the database.

24. The method of claim 21, where the operation of rendering the identified information comprises:
   organizing the data elements in a multiple-view format that comprises:
      a first guideline that instances of said format include one or more data elements, where each data element has one of multiple predetermined media types;
      a second guideline that all data elements of an instance of the format represent the same content;
      a third guideline that data elements of each instance of the format occur in presentation independent form;
   selecting data elements of the organized data elements that are compatible with the requestor's personal interface and rendering the selected data elements to the requestor's personal interface.

25. A method of rendering personalized content to requesters, comprising operations of:
   operating an Internet web server to receive user preferences specifying, for each user, one or more desired topics from a predefined list of topics and, within each topic, one or more desired topic-specific segments from predefined lists of topic-specific segments;
   responsive to receiving an incoming request submitted by a user via personal interface, establishing a communication link with the user's personal interface device and while the link is established, performing operations comprising:
      retrieving the user's preferences, selecting content having one or more media types from a preassembled multimedia database, said content being selected according to the user's preferences and the media types being selected according to the capabilities of personal interface;
      presenting the selected content to be user's personal interface.

26. An apparatus for delivering information to requesters, comprising:
   a digital data storage;
   a communications server responsive to receiving requesters' connection requests from personal interfaces, to establish communication connections with the personal interfaces and transmit playback requests to a session server, the personal interfaces comprising at least one of the following: telephone, web-enabled phone, Internet web browser;
   a content processor coupled to the storage, and programmed to assemble a universal database by gathering content instances each including one or more data elements in predefined topics, where data elements of a content instance provide alternative representations of the same item of information in different media types;
   a session server coupled to the storage and responsive to playback requests to perform the following operations during each connection:
      retrieving pre-stored preferences specific to the caller, said preferences including content preferences;
      identifying content instances in the universal database that pertain to the requestor's pre-stored content preferences; transmitting the identified information to the communications server;
   the communications server being further programmed to identify data elements of the identified content instance having media types compatible with the requestor's personal interface, and to render the identified information to the requestor's personal interface in suitable format for playback to the requestor's personal interface.

27. The apparatus of claim 26, where the content processor is programmed such that the operation of assembling the universal database further comprises:

receiving information content provided in a multiple-view format that comprises a first guideline that instances of said format include one or more data elements, where each data element has one of multiple predetermined media types; a second guideline that all data elements of an instance of the format represent the same content; a third guideline that data elements of each instance of the format occur in presentation independent form.

28. The apparatus of claim 26, where the content processor is programmed such that the operation of assembling the universal database further comprises:

organizing the data elements in a multiple-view format that comprises:
- a first guideline that instances of said format include one or more data elements, where each data element has one of multiple predetermined media types:
- a second guideline that all data elements of an instance of the format represent the same content;
- a third guideline that data elements of each instance of the format occur in presentation independent form;

storing the organized data elements in the database.

29. The apparatus of claim 26, where the session server and communications server are programmed such that the operation of rendering the identified information comprises:

organizing the data elements in a multiple-view format that comprises:
- a first guideline that instances of said format include one or more data elements, where each data element has one of multiple predetermined media types;
- a second guideline that all data elements of an instance of the format represents the same content;
- a third guideline that data elements of each instance of the format occur in presentation independent form;

selecting data elements of the organized data elements that are compatible with the requestor's personal interface and rendering the selected data elements to the requester's personal interface.

* * * * *

UNITED STATES PATENT AND TRADEMARK OFFICE
CERTIFICATE OF CORRECTION

| | | |
|---|---|---|
| PATENT NO. | : 7,028,252 B1 | |
| APPLICATION NO. | : 09/814623 | |
| DATED | : April 11, 2006 | |
| INVENTOR(S) | : Chaitanya Baru | |

It is certified that error appears in the above-identified patent and that said Letters Patent is hereby corrected as shown below:

Title page, item [75] add inventor:

(75) Inventors: --Joshua Bass--

Signed and Sealed this

Twenty-seventh Day of May, 2008

JON W. DUDAS
*Director of the United States Patent and Trademark Office*